USO11236882B2

(12) United States Patent
Maruyama et al.

(10) Patent No.: US 11,236,882 B2
(45) Date of Patent: Feb. 1, 2022

(54) VEHICLE LAMP WITH CONTROLLING UNIT AND REFLECTIVE BODY

(71) Applicant: KOITO MANUFACTURING CO., LTD., Tokyo (JP)

(72) Inventors: Yuta Maruyama, Shizuoka (JP); Naoki Kawabata, Shizuoka (JP); Kentarou Murakami, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/846,845

(22) Filed: Apr. 13, 2020

(65) Prior Publication Data
US 2020/0238892 A1 Jul. 30, 2020

Related U.S. Application Data

(63) Continuation of application No. PCT/JP2018/037674, filed on Oct. 10, 2018.

(30) Foreign Application Priority Data

Oct. 13, 2017 (JP) .............................. JP2017-199342
Oct. 20, 2017 (JP) .............................. JP2017-203955
(Continued)

(51) Int. Cl.
F21S 41/675 (2018.01)
F21S 41/32 (2018.01)
(Continued)

(52) U.S. Cl.
CPC ............ F21S 41/675 (2018.01); B60Q 1/076 (2013.01); F21S 41/32 (2018.01); F21W 2102/13 (2018.01); F21W 2102/20 (2018.01)

(58) Field of Classification Search
CPC .............. F21S 41/675; F21W 2102/13; F21W 2102/20; B60Q 1/076; B60Q 1/14; B60Q 1/1407; B60Q 1/143
See application file for complete search history.

(56) References Cited

U.S. PATENT DOCUMENTS

2013/0038736 A1* 2/2013 Yamamura .............. G01S 13/88
348/148
2013/0039080 A1 2/2013 Yamazaki et al.
(Continued)

FOREIGN PATENT DOCUMENTS

DE 102009024129 A1 * 12/2010 ............ B60Q 1/143
DE 102009024129 A1 12/2010
(Continued)

OTHER PUBLICATIONS

International Preliminary Report on Patentability (Form PCT/IB/373) and the Written Opinion of the International Searching Authority (Form PCT/ISA/237) dated Apr. 14, 2020, in corresponding International Application No. PCT/JP2018/037674. (37 pages).
(Continued)

Primary Examiner — Keith G. Delahoussaye
(74) Attorney, Agent, or Firm — Buchanan Ingersoll & Rooney PC

(57) ABSTRACT

A vehicle lamp includes a first lamp unit that includes a light source, a driving unit, and a reflective body that is driven by the driving unit to repeat a periodic motion and thus scans an exit beam from the light source; and a controlling unit that controls the first lamp unit. The controlling unit instructs that the driving unit be driven until a first duration $T_1$ has passed even in a case where the controlling unit has received an illumination instruction instructing the first lamp unit to emit a beam and then received a stop instruction instructing the first lamp unit to stop emitting a beam.

22 Claims, 23 Drawing Sheets

(30) Foreign Application Priority Data

Nov. 1, 2017 (JP) .............................. JP2017-211805
Nov. 28, 2017 (JP) .............................. JP2017-228053

(51) Int. Cl.
*B60Q 1/076* (2006.01)
*F21W 102/20* (2018.01)
*F21W 102/13* (2018.01)

(56) References Cited

U.S. PATENT DOCUMENTS

| | | | |
|---|---|---|---|
| 2016/0167566 A1* | 6/2016 | Tanaka | F21S 41/663 315/82 |
| 2016/0341390 A1 | 11/2016 | Yamamura et al. | |
| 2017/0282786 A1 | 10/2017 | Toda et al. | |
| 2018/0014395 A1 | 1/2018 | Ichikawa et al. | |
| 2018/0170243 A1 | 6/2018 | Mizuno et al. | |

FOREIGN PATENT DOCUMENTS

| | | |
|---|---|---|
| DE | 102014113478 A1 | 3/2016 |
| EP | 2036770 A2 | 3/2009 |
| EP | 2 484 557 A2 | 8/2012 |
| EP | 2918446 A1 | 9/2015 |
| EP | 3061653 A1 | 8/2016 |
| EP | 3246204 A1 | 11/2017 |
| JP | 2012-162121 A | 8/2012 |
| JP | 2013-038038 A | 2/2013 |
| JP | 2016-088283 A | 5/2016 |
| JP | 2016-185717 A | 10/2016 |
| JP | 2017037806 A | 2/2017 |
| WO | 01/70538 A2 | 9/2001 |
| WO | 2016/104319 A1 | 6/2016 |
| WO | 2016/152465 A1 | 9/2016 |
| WO | 2016167250 A1 | 10/2016 |
| WO | 2016/203911 A1 | 12/2016 |

OTHER PUBLICATIONS

International Search Report (Form PCT/ISA/210) dated Dec. 25, 2018, in corresponding International Application No. PCT/JP2018/037674. (8 pages).
Office Action (Communication pursuant to Rule 164(1) EPC/The partial supplementary European search report) dated Jun. 4, 2021, by the European Patent Office in corresponding European Patent Application No. 18867053.3. (14 pages).
Extended European Search Report dated Nov. 10, 2021, issued in corresponding European Application No. 21185838.6 (7 pages).
Extended European Search Report dated Dec. 10, 2021, issued in corresponding European Application No. 21185851.9 (6 pages).

* cited by examiner

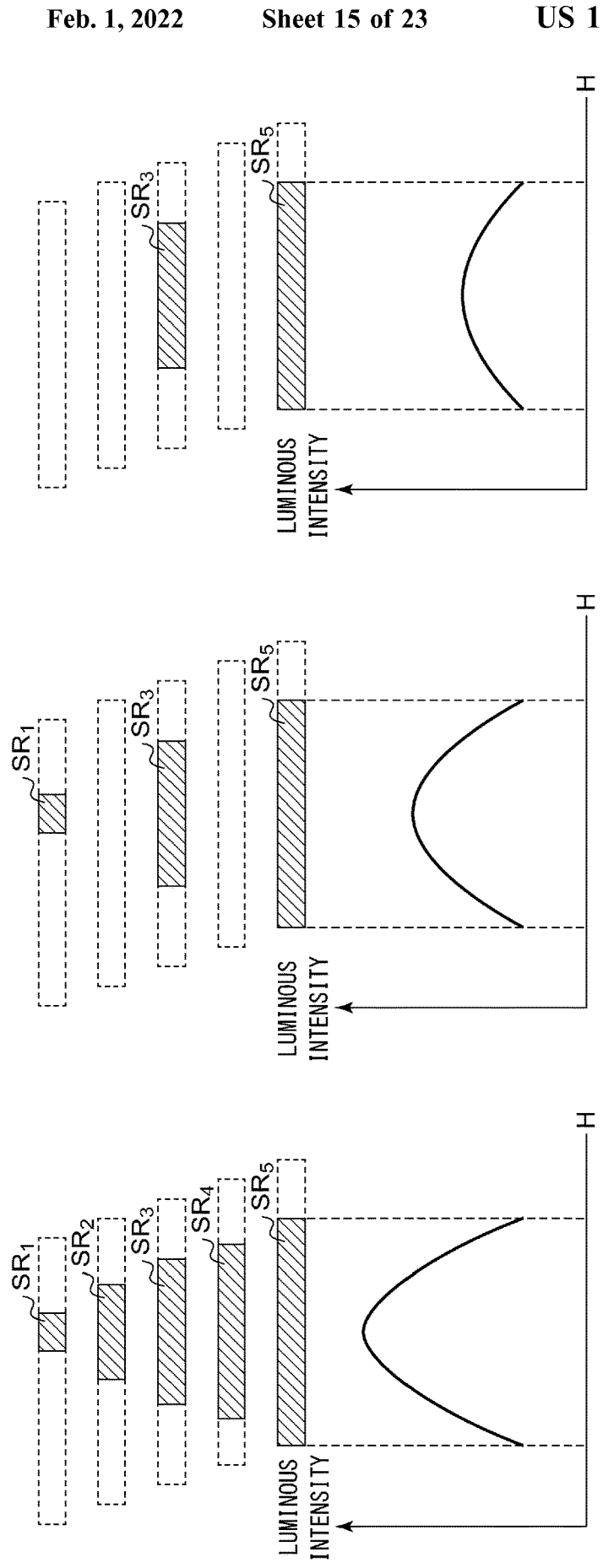

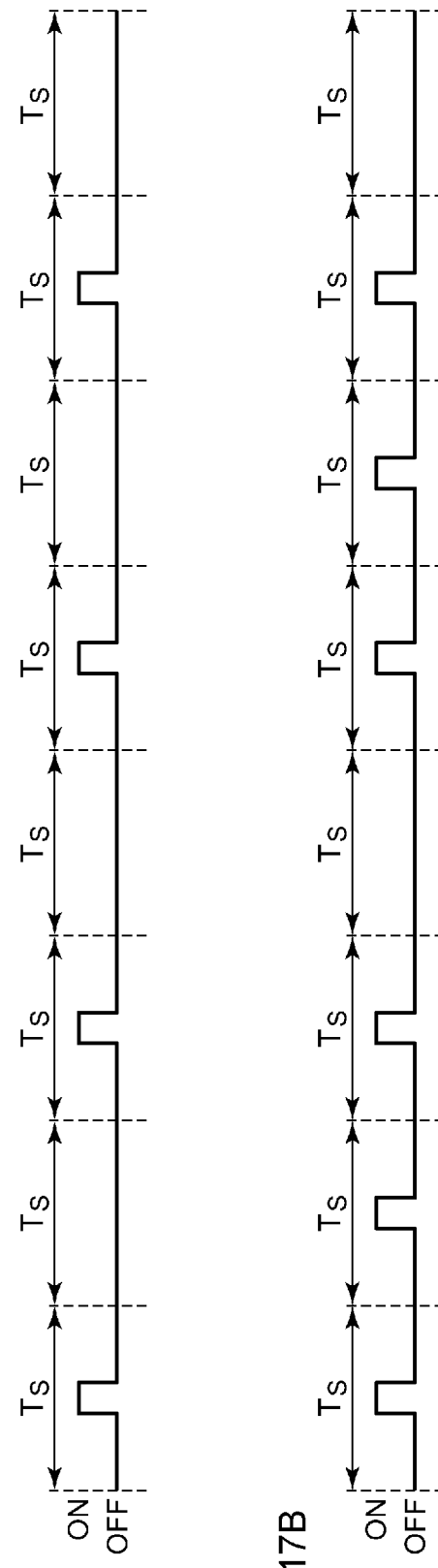

VEHICLE LAMP WITH CONTROLLING UNIT AND REFLECTIVE BODY

CROSS-REFERENCE TO RELATED APPLICATIONS

This application is based upon and claims the benefit of priority from the prior Japanese Patent Application No. 2017-199342, filed on Oct. 13, 2017, Japanese Patent Application No. 2017-203955, filed on Oct. 20, 2017, Japanese Patent Application No. 2017-211805, filed on Nov. 1, 2017, Japanese Patent Application No. 2017-228053, filed on Nov. 28, 2017 and International Patent Application No. PCT/JP2018/037674, filed on Oct. 10, 2018, the entire content of each of which is incorporated herein by reference.

BACKGROUND OF THE INVENTION

Field of the Invention

The present invention relates to vehicle lamps.

Description of the Related Art

Typically, vehicle lamps are capable of a switch between a low beam and a high beam. A low beam illuminates a close range with a predetermined luminous intensity. Light distributions for low beams are defined so as to keep oncoming vehicles or preceding vehicles from glare. Low beams are used mainly when vehicles travel in urban areas. Meanwhile, a high beam illuminates a distant range over a broad area ahead of the vehicle with a relatively high luminous intensity. High beams are used mainly when vehicles travel at high speed on a road with little oncoming traffic or little preceding traffic. Thus, a high beam provides better visibility for the driver than a low beam does but disadvantageously causes pedestrians and/or drivers of vehicles in front of the host vehicle to experience glare.

With the ADB (Adaptive Driving Beam) technology proposed in recent years, a high beam light distribution pattern is dynamically and adaptively controlled based on the conditions in the surroundings of the vehicle. With the ADB technology, any preceding vehicle, oncoming vehicle, or pedestrian in front of the host vehicle is detected, and light that is to illuminate a region corresponding to a detected vehicle or pedestrian is reduced, for example. Thus, glare that could be experienced by the vehicle or the pedestrian is reduced.

Proposed methods for implementing the ADB function include a shutter method in which an actuator is controlled, a rotary method, and an LED array method. The shutter method or the rotary method allows the width of an off region (light-blocked region) to be varied continuously but allows for only one off region to be present. The LED array method allows for a plurality of off regions to be set, but the width of an off region is restricted by the illumination width of an LED chip, which results in being discrete.

The applicant has proposed a scan method as an ADB method that can solve the above problems (see patent document 1). In this scan method, a desired light distribution pattern is formed in front of a vehicle through the following. Specifically, light from a light source is made incident on a reflective body that is driven by a driving unit to repeat a periodic motion. The reflective body reflects incident light at an angle corresponding to the position of the reflective body in the periodic motion and scans the space in front of the vehicle with the reflected light. At the same time, the light source is turned on or off or the quantity of light from the light source is varied in accordance with the position of the reflective body in the periodic motion.

[patent document 1] JP2016-088283

(1) With a vehicle lamp of a scan method, turning on the light source before the operation of the driving unit and the reflective body stabilizes may cause a flicker. Therefore, the light source is turned on after the operation has stabilized. If the driving unit is stopped while the light source is off in consideration of the lifetime of the driving unit, there is a period of waiting for the operation of the driving unit to stabilize each time the light source is turned on. In this case, the light source fails to turn on at an expected timing, and this may cause a feeling of discomfort or uneasiness in the driver.

The present invention has been made in view of the above situation, and one example aim of one aspect of the present invention is to provide a vehicle lamp that allows a driving unit to have an extended lifetime and that can reduce any discomfort or uneasiness that could be felt by the driver.

(2) The present invention has been made in view of the above situation, and one example aim of one aspect of the present invention is to provide a vehicle lamp that can provide the driver with an increased level of comfort.

(3) With a vehicle lamp of a scan method, the luminous intensity distribution of a light distribution pattern can be changed to a desired luminous intensity distribution if the brightness of the light source can be changed to a desired brightness on a time segment by time segment basis within one scan, that is, if the driving current supplied to the light source can be changed to a desired current value on a time segment by time segment basis within one scan. However, enabling the change in the driving current supplied to a light emitting unit to a desired current value on a time segment by time segment basis within one scan requires the use of a microcomputer that supports DA conversion or a microcomputer port output and a peripheral component for the current control resolution, and this may lead to an increase in cost.

The present invention has been made in view of the above situation, and one example aim of one aspect of the present invention is to provide a vehicle lamp that allows the luminous intensity distribution of a light distribution pattern to be changed, while the cost is kept relatively low.

(4) The present invention has been made in view of the above situation, and one example aim of one aspect of the present invention is to provide a vehicle lamp capable of forming appropriate light distributions in various conditions.

SUMMARY OF THE INVENTION (1) A vehicle lamp according to an aspect of the present invention includes a lamp unit that includes a light source, a driving unit, and a reflective body that is driven by the driving unit to repeat a periodic motion and thus scans an exit beam from the light source; and a controlling unit that controls the lamp unit. The controlling unit instructs that the driving unit be driven until a first duration has passed even in a case where the controlling unit has received an illumination instruction for the lamp unit and then received a stop instruction for the lamp unit.

Another aspect of the present invention also provides a vehicle lamp. The vehicle lamp includes a first lamp unit capable of illuminating a first illumination region, a second lamp unit capable of illuminating a second illumination region, and a controlling unit that controls the first lamp unit and the second lamp unit. The first lamp unit includes a light source, a driving unit, and a reflective body that is driven by the driving unit to repeat a periodic motion and thus scans an exit beam from the light source. The controlling unit instructs that the driving unit be driven until a first duration has passed even in a case where the controlling unit has received an illumination instruction for the first lamp unit and then received a stop instruction for the first lamp unit. The controlling unit instructs that the driving unit be driven while the second lamp unit is emitting a beam, regardless of an illumination instruction for the first lamp unit.

Yet another aspect of the present invention also provides a vehicle lamp. The vehicle lamp includes a first lamp unit capable of illuminating a first illumination region, a second lamp unit capable of illuminating a second illumination region, and a controlling unit that controls the first lamp unit and the second lamp unit. The first lamp unit includes a light source, a driving unit, and a reflective body that is driven by the driving unit to repeat a periodic motion and thus scans an exit beam from the light source. The controlling unit instructs that the driving unit be driven until a first duration has passed even in a case where the controlling unit has received an illumination instruction for the first lamp unit and the second lamp unit and then received a stop instruction for the first lamp unit and the second lamp unit.

(2) A vehicle lamp according to another aspect of the present invention includes a light source, an optical system that repeats a periodic motion and thus scans an exit beam from the light source, and a controlling unit that controls on/off of the light source to form a predetermined light distribution pattern. The controlling unit sets a brightness of the light source to no higher than a predetermined value in a partial time segment within one scan period and thus forms a non-illumination region in a region corresponding to the time segment. When the non-illumination region is to be changed over to an illumination region, the controlling unit starts changing the non-illumination region over to the illumination region from one end and changes gradually toward another end of the non-illumination region in a widthwise direction of a vehicle.

(3) A vehicle lamp according to yet another aspect of the present invention includes a lamp unit that includes a first light emitting unit, a second light emitting unit, and an optical system that repeats a periodic motion and thus scans an exit beam from the first light emitting unit and an exit beam from the second light emitting unit; and a controlling unit that sets an on period separately for each of the first light emitting unit and the second light emitting unit within one scan period in synchronization with the periodic motion and thus forms a light distribution pattern in which respective scan beams associated with the first light emitting unit and the second light emitting unit are combined. The controlling unit varies the on period, within one scan period, of at least one of the first light emitting unit and the second light emitting unit and thus changes a luminous intensity distribution of the light distribution pattern.

(4) A vehicle lamp according to still another aspect of the present invention includes a lamp unit that forms a light distribution pattern in front of a vehicle and a controlling unit that controls the lamp unit to allow the light distribution pattern to have a non-illumination region that is adapted for a vehicle in front of the vehicle and that has a luminous intensity no higher than a predetermined value. The controlling unit controls the lamp unit to allow an illumination region of the light distribution pattern to have a transition region, located in the vicinity of a boundary with the non-illumination region, that has a luminous intensity decreasing toward the non-illumination region and reaching a predetermined value at an end portion in the non-illumination region and to cause the luminous intensity in the transition region to change more gently as a distance between a host vehicle and the vehicle in front of the host vehicle is smaller.

It is to be noted that any optional combination of the above constituent elements and an embodiment obtained by replacing the constituent elements of the present invention or what is expressed by the present invention among a method, an apparatus, a system, and so on are also effective as an embodiment of the present invention.

BRIEF DESCRIPTION OF THE DRAWINGS

FIGS. 15A to 15C are illustrations for describing yet another example of a change in the luminous intensity distribution of a light distribution pattern;

FIGS. 17A and 17B are each a timing chart illustrating an example of an on/off state of a light emitting unit;

MODE FOR CARRYING OUT THE INVENTION

Figure 1:
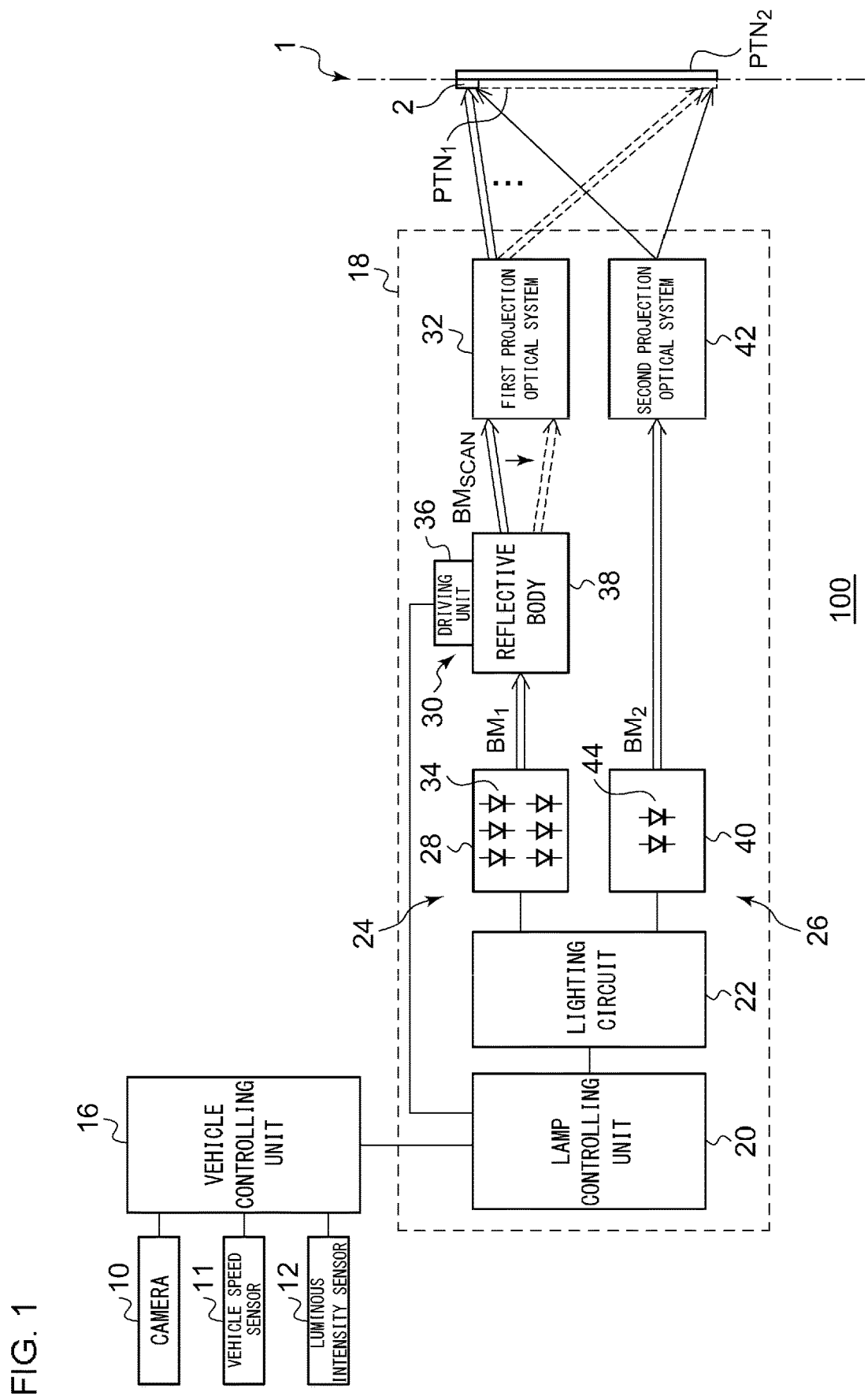
FIG. 1 is a schematic diagram illustrating a configuration of a vehicle lamp system that includes a vehicle lamp according to a first embodiment.

Hereinafter, the present invention will be described based on exemplary embodiments with reference to the drawings. Identical or equivalent constituent elements, members, and processes illustrated in the drawings are given identical reference characters, and duplicate descriptions thereof will be omitted as appropriate. The embodiments are illustrative in nature and are not intended to limit the invention. Not all the features and combinations thereof described in the embodiments are necessarily essential to the invention.

First Embodiment

FIG. 1 is a schematic diagram illustrating a configuration of a vehicle lamp system 100 that includes a vehicle lamp 18 according to a first embodiment. The vehicle lamp system 100 includes a camera 10, a vehicle speed sensor 11, a luminous intensity sensor 12, a vehicle controlling unit 16, and the vehicle lamp 18.

The camera 10 captures an image of a space in front of the vehicle. The vehicle speed sensor 11 detects the vehicle speed by detecting the rotation speed of wheels. The luminous intensity sensor 12 detects the luminous intensity in the surroundings of the vehicle.

The vehicle controlling unit 16 integrally controls the vehicle. The vehicle controlling unit 16 according to the present embodiment is configured to be capable of executing ADB (Adaptive Driving Beam) control. The ADB control is executed in response to an execution instruction for the ADB control from a light switch (not illustrated), for example. The vehicle controlling unit 16 detects the condition of the host vehicle or a vehicle in front of the host vehicle based on information detected by the camera 10 and/or the vehicle speed sensor 11. Then, based on the detected condition, the vehicle controlling unit 16 determines whether to form a light distribution pattern with a first lamp unit (described later) that illuminates at least a portion of a high beam light distribution region, that is, whether to cause the first lamp unit to emit a beam. If a light distribution pattern is to be formed, the vehicle controlling unit 16 determines the shape of the light distribution pattern. The vehicle controlling unit 16 then instructs the vehicle lamp 18 to form the determined light distribution pattern.

The vehicle controlling unit 16 is configured to be capable of executing auto light control as well. The auto light control is executed in response to an execution instruction for the auto light control from a light switch (not illustrated), for example. Upon the luminous intensity in the surroundings of the vehicle detected by the luminous intensity sensor 12 reaching or falling below a predetermined threshold, that is, upon the surroundings of the vehicle becoming dark, the vehicle controlling unit 16 instructs the vehicle lamp 18 to cause each lamp unit to emit a beam. Meanwhile, upon the luminous intensity in the surroundings of the vehicle detected by the luminous intensity sensor 12 exceeding the threshold, that is, upon the surroundings of the vehicle becoming bright, the vehicle controlling unit 16 instructs the vehicle lamp 18 to cause each lamp unit to stop emitting a beam.

The vehicle lamp 18 includes a lamp controlling unit 20, a lighting circuit 22, a first lamp unit 24, and a second lamp unit 26. The vehicle lamp 18 forms a light distribution pattern by superposing a scan light distribution formed by the first lamp unit 24 and a non-scan light distribution formed by the second lamp unit 26 on top of each other.

The first lamp unit 24 is configured to be capable of illuminating a first illumination region that includes at least a portion of a high beam light distribution region. The first lamp unit 24 includes a first light source 28, a scan optical system 30, and a first projection optical system 32. The first light source 28 includes at least one light emitting unit 34. The light emitting unit 34 includes a semiconductor light source, such as an LED (light emitting diode) or an LD (laser diode).

The scan optical system 30 includes a driving unit 36 and a reflective body 38. The driving unit 36 is a motor in the present embodiment and is, for example, a brushless DC motor. The reflective body 38 is a reflector or is more specifically a rotary reflector in the present embodiment. The reflective body 38 is attached to a rotor of the driving unit 36 and makes a rotary motion. The reflective body 38 repeats the rotary motion and thus scans an exit beam $BM_1$ from the first light source 28 in the lateral direction. An exit beam from the scan optical system 30 will be referred to as a scan beam $BM_{SCAN}$. The scanning frequency of the scan optical system 30 is set to no lower than 60 Hz or set, for example, to around 200 Hz in order to prevent a flicker.

The first projection optical system 32 projects the scan beam $BM_{SCAN}$ scanned by the scan optical system 30 onto a virtual vertical screen 1 in front of the lamp and thus forms a first light distribution pattern $PTN_1$. A region illuminated by the scan beam $BM_{SCAN}$ at a given time will be referred to as an illumination region 2. The first light distribution pattern $PTN_1$ is formed as the illumination region 2 moves in the lateral direction over the virtual vertical screen 1.

The first projection optical system 32 can be constituted by a reflective optical system, a transmissive optical system, or a combination thereof. The first projection optical system 32 can be omitted if the divergence angle, the exit angle, and so on of the exit beam from the first light source 28 are designed appropriately.

The second lamp unit 26 is configured to be capable of illuminating a second illumination region, which is a low beam light distribution region. The second lamp unit 26 includes a second light source 40 and a second projection optical system 42. The second light source 40 includes at least one light emitting unit 44. The light emitting unit 44 includes a semiconductor light source, such as an LED (light emitting diode) or an LD (laser diode).

The second projection optical system 42 projects an exit beam $BM_2$ from the second light source 40 onto the virtual vertical screen 1 and thus forms a second pattern $PTN_2$ substantially vertically below the first light distribution pattern $PTN_1$. The second projection optical system 42 can be constituted by a reflective optical system, a transmissive optical system, or a combination thereof.

The lighting circuit 22 is configured to be capable of switching between on and off of each of the first light source 28 and the second light source 40.

The lamp controlling unit 20 controls the lighting circuit 22 and thus turns on or off the first light source 28 of the first lamp unit 24. For example, the lamp controlling unit 20 can vary the luminous intensity in the illumination region 2 over time in synchronization with the scanning motion of the scan optical system 30. For example, setting the brightness of the first light source 28 to zero in a certain time segment within one scan period allows the light to be blocked in the region corresponding to that time segment. Conversely, raising the brightness of the first light source 28 in a certain time segment within one scan period allows the region corresponding to that time segment to be illuminated with a spotlight. The brightness of the first light source 28 may be controlled through the amount of driving current supplied to the light emitting unit 34, through the number of light emitting units 34 that are on, or through the combination thereof.

The lamp controlling unit 20 controls the lighting circuit 22 and thus supplies a constant driving current to the second light source 40 to keep the brightness of the second light source 40 constant, independent of the scanning motion of the scan optical system 30.

The lamp controlling unit 20 also controls the rotation rate of the driving unit 36 and in turn the rotation rate of the reflective body 38. To keep the beam emitted from the first lamp unit 24 from flickering, the lamp controlling unit 20 turns on the first light source 28 while the rotation rate of the driving unit 36 is stable at a target value. Specifically, the lamp controlling unit 20 turns on the first light source 28 immediately if the rotation rate of the driving unit 36 has stabilized at the target value, that is, if the rotation rate has reached the target value when the lamp controlling unit 20 has received an illumination instruction instructing the first lamp unit 24 to emit a beam. In contrast, if the rotation rate of the driving unit 36 has not stabilized at the target value, that is, if the rotation rate has not reached the target value (e.g., if the rotation rate is zero) when the lamp controlling unit 20 has received an illumination instruction, the lamp controlling unit 20 instructs that the driving unit 36 be driven to raise the rotation rate of the driving unit 36 and turns on the first light source 28 after the rotation rate of the driving unit 36 has stabilized at the target value.

The lamp controlling unit 20 instructs that the driving unit 36 be driven to rotate at the target rotation rate, that is, at the rotation rate held when the first light source 28 is turned on while the second lamp unit 26 is emitting a beam, regardless of an illumination instruction for the first lamp unit 24. In this case, the lamp controlling unit 20 may instruct that the driving unit 36 be so driven as to keep rotating at the rotation rate lower than the target rotation rate (e.g., at the rotation rate one half the target value).

The lamp controlling unit 20 turns off the first light source 28 immediately upon receiving a stop instruction instructing the first lamp unit 24 to stop emitting a beam. However, the lamp controlling unit 20 instructs that the driving unit 36 be so driven as to keep rotating at the target rotation rate, that is, at the rotation rate held when the first light source 28 is turned on at least until a first duration (e.g., 10 seconds) has passed since the reception of the stop instruction. In this case, the lamp controlling unit 20 may instruct that the driving unit 36 be so driven as to keep rotating at the rotation rate lower than the target rotation rate (e.g., at the rotation rate one half the target value). The lamp controlling unit 20 may instruct that the driving unit 36 be driven such that the rotation rate of the driving unit 36 decreases gradually to bring the rotation rate of the driving unit 36 to substantially zero when a first duration $T_1$ has passed, for example.

An operation of the vehicle lamp system 100 configured as described above will be described.

Figure 2:
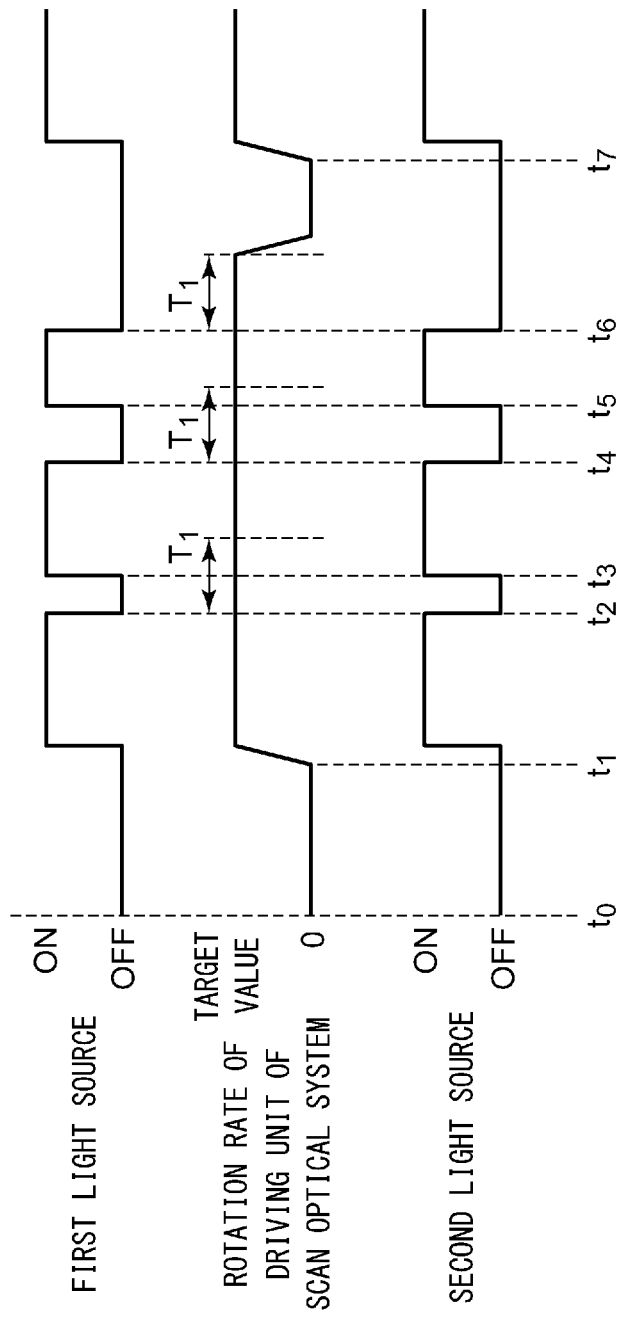
FIG. 2 illustrates an operation performed in a case where an illumination instruction and a stop instruction are repeated relatively frequently and issued substantially simultaneously for a first lamp unit 24 and a second lamp unit 26.

FIG. 2 illustrates an operation performed in a case where an illumination instruction and a stop instruction are repeated relatively frequently and issued substantially simultaneously for the first lamp unit 24 and the second lamp unit 26. For example, the operation illustrated in FIG. 2 corresponds to an operation performed in auto light control. Specifically, the operation illustrated in FIG. 2 corresponds to an operation performed in a case where the vehicle travels a segment where relatively short tunnels appear successively or the vehicle travels a segment where a shaded area and a sunlit area appear in an alternating manner while the execution of auto light control is being instructed during daytime. In addition, the operation illustrated in FIG. 2 corresponds to an operation performed in flashing.

In FIG. 2, an illumination instruction is issued for the first lamp unit 24 and the second lamp unit 26 at times t1, t3, t5, and t7; and a stop instruction is issued for the first lamp unit 24 and the second lamp unit 26 at times t2, t4, and t6.

As illustrated in FIG. 2, even with a stop instruction, the driving unit 36 keeps rotating at the target rotation rate at least until a first duration $T_1$ has passed. A stop instruction is issued for the first lamp unit 24 at times t2 and t4. However, because an illumination instruction is issued for the first lamp unit 24 at times t3 and t5, that is, before the first duration $T_1$ has passed since a stop instruction, the driving unit 36 keeps rotating at the target rotation rate even after the first duration $T_1$ has passed. In contrast, a stop instruction is issued for the first lamp unit 24 at time t6. Because no illumination instruction is issued for the first lamp unit 24 before the first duration $T_1$ has passed since the stop instruction, the driving unit 36 stops being driven after the first duration $T_1$ has passed since time t6.

As illustrated in FIG. 2, upon an illumination instruction being issued, the first light source 28 is turned on after the rotation rate of the driving unit 36 has reached the target value. An illumination instruction is issued for the first lamp unit 24 at times t1 and t7, but because the rotation rate of the driving unit 36 is substantially zero, the first light source 28 and the second light source 40 are turned on after the rotation rate of the driving unit 36 has reached the target value. Here, the second light source 40 may be turned on before the rotation rate of the driving unit 36 has reached the target value. Meanwhile, an illumination instruction is issued for the first lamp unit 24 at times t3 and t5 before the first duration $T_1$ has passed since a stop instruction, that is, an illumination instruction is issued for the first lamp unit 24 while the driving unit 36 is rotating at the target rotation rate. Therefore, the first light source 28 is turned on immediately.

Figure 3:
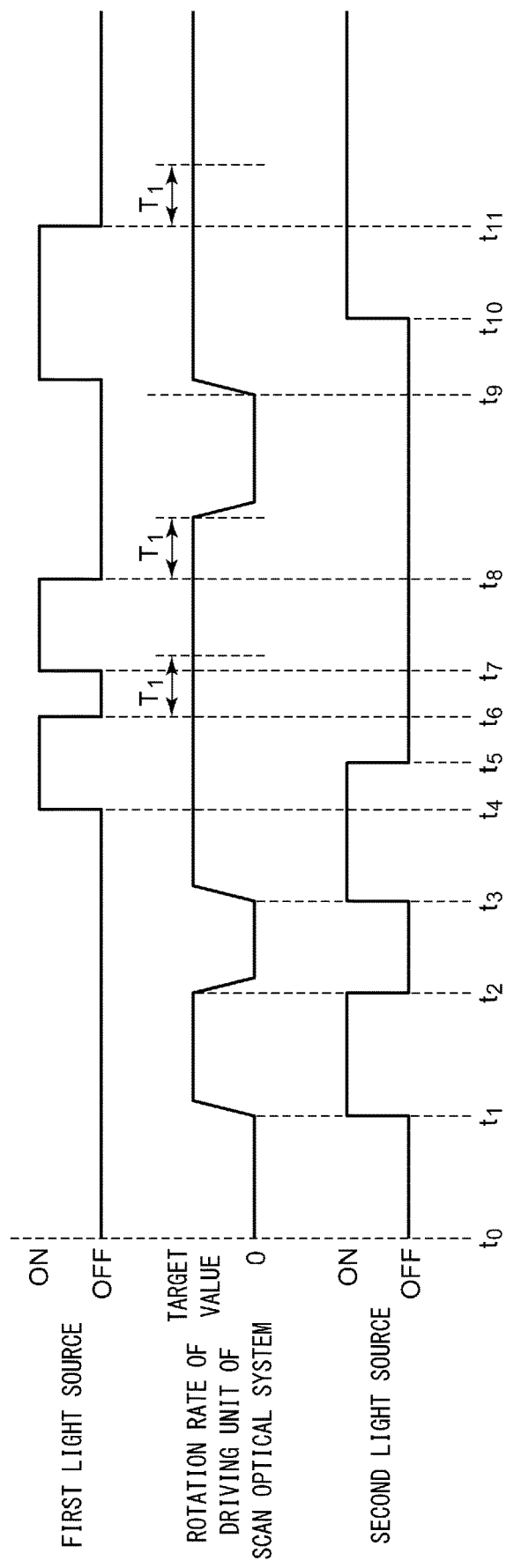
FIG. 3 illustrates an operation performed in a case where an illumination instruction and a stop instruction for a first lamp unit are issued independently from an illumination instruction and a stop instruction issued for a second lamp unit.

FIG. 3 illustrates an operation performed in a case where an illumination instruction and a stop instruction are issued for the first lamp unit 24 independently from an illumination instruction and a stop instruction issued for the second lamp unit 26. For example, the operation illustrated in FIG. 3 corresponds to an operation performed in ADB control or an operation performed when the first lamp unit and the second lamp unit are each operated manually.

In FIG. 3, an illumination instruction is issued for the first lamp unit 24 at times t4, t7, and t9; a stop instruction is issued for the first lamp unit 24 at times t6, t8, and t11; an illumination instruction is issued for the second lamp unit 26 at times t1, t3, and t10; and a stop instruction is issued for the second lamp unit 26 at times t2 and t5.

As illustrated in FIG. 3, the driving unit 36 rotates at the target rotation rate while the second lamp unit 26 is emitting a beam, regardless of an illumination instruction for the first lamp unit 24. For example, because the second lamp unit 26 is emitting a beam from time t1 to time t2 and from time t3 to time t4, the driving unit 36 rotates at the target rotation rate although no illumination instruction is being issued for the first lamp unit 24.

With the vehicle lamp 18 according to the present embodiment described above, basically, the driving unit 36 stops being driven while the first lamp unit 24 is not emitting any beam. This helps extend the lifetime of the driving unit 36. In addition, with the vehicle lamp 18, when a stop instruction is issued for the first lamp unit 24, the driving unit 36 is not stopped immediately, and the driving unit 36 is kept rotating at least until the first duration has passed. This allows the driving unit 36 to keep rotating in a case where an illumination instruction and a stop instruction are repeated relatively frequently for the first lamp unit 24, and this helps reduce an instance where there is a time lag until the rotation rate of the driving unit 36 reaches the target value after an illumination instruction has been issued. In other words, the driver can be kept from feeling discomfort or uneasiness.

In this manner, the vehicle lamp 18 according to the present embodiment allows the driving unit 36 to have an extended lifetime and can reduce any discomfort or uneasiness that could be felt by the driver.

When the second lamp unit 26 is emitting a beam, it is highly likely that the vehicle is traveling in the dark—for example, traveling at night or in a tunnel. Therefore, it is highly likely that an illumination instruction is issued for the first lamp unit 24. In this respect, with the vehicle lamp 18 according to the present embodiment, the driving unit 36 rotates at the target rotation rate while the second lamp unit 26 is emitting a beam, regardless of an illumination instruction for the first lamp unit 24. Accordingly, the first lamp unit 24 can emit a beam immediately upon an illumination instruction being issued for the first lamp unit 24, and this can help reduce any discomfort or uneasiness that could be felt by the driver.

Thus far, one aspect of the present invention has been described based on the first embodiment. Now, some modification examples associated with the first embodiment will be described.

First Modification Example

In the scan optical system 30 described in the first embodiment, the driving unit 36 is a motor, and the reflective body 38 is a reflector or is more specifically a rotary reflector. This, however, is not a limiting example. It suffices that the scan optical system 30 be configured such that the driving unit 36 drives the reflective body 38 and the reflective body 38 is driven by the driving unit 36 to repeat a periodic motion and thus scans an exit beam from a light source.

For example, in the scan optical system 30, the driving unit 36 may be a motor, and the reflective body 38 may be a mirror that can swing about an axis parallel to its reflective surface.

Alternatively, for example, the scan optical system 30 may be a MEMS (Micro ElectroMechanical System). Specifically, the driving unit 36 may be a resonator serving as an actuator, and the reflective body 38 may be a MEMS mirror. In this case, the rotation rate in the first embodiment may be read as a resonance frequency. Turning on a light source before the resonance motion of the resonator and the MEMS mirror stabilizes may cause a flicker. Therefore, the light source needs to be turned on after the resonance motion has stabilized. If the resonator is stopped while the light source is off in consideration of the lifetime of the resonator, there will be a time lag until the resonance motion of the resonator stabilizes each time the light source is turned on. In other words, this may pose an issue similar to that in the case where the driving unit 36 is a motor. Hence, applying the technical idea of the first embodiment to the present modification example allows the driving unit 36 to have an extended lifetime and can reduce any discomfort or uneasiness that could be felt by the driver.

Second Modification Example

In the first embodiment and the modification example described above, the lamp controlling unit 20 drives the driving unit 36 of the first lamp unit 24 while the second lamp unit 26 is emitting a beam. This, however, is not a limiting example.

Figure 4:
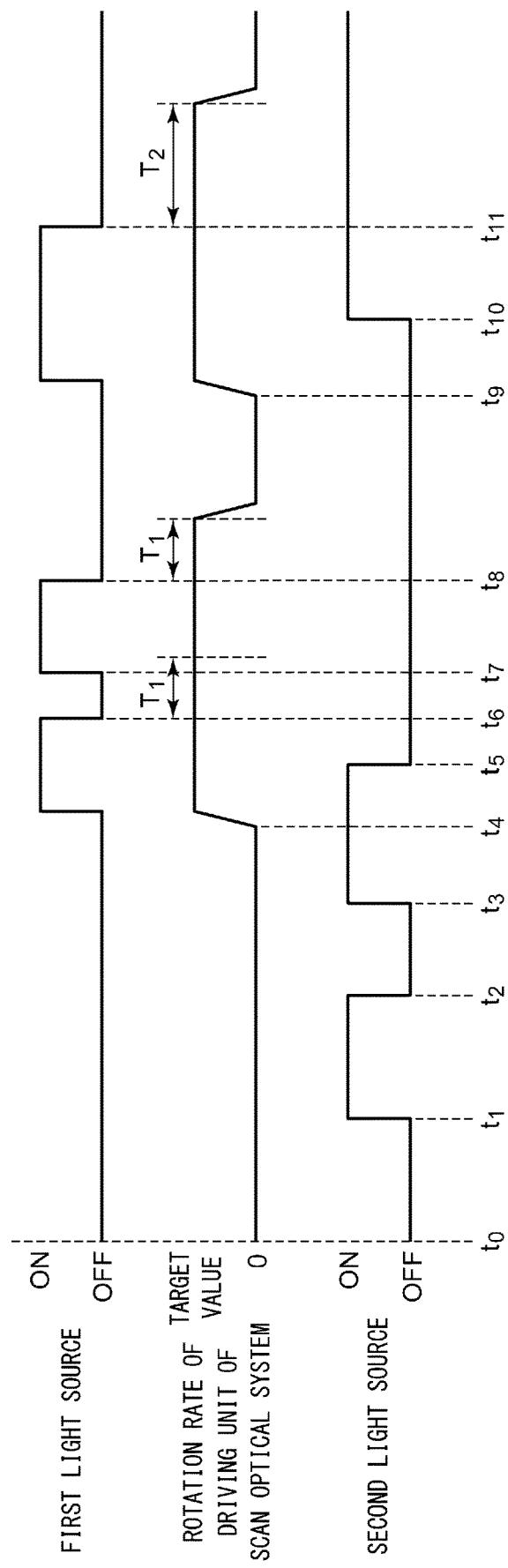
FIG. 4 illustrates an operation performed in a case where an illumination instruction and a stop instruction for a first lamp unit are issued independently from an illumination instruction and a stop instruction issued for a second lamp unit in a vehicle lamp system according to a modification example.

FIG. 4 illustrates an operation performed in a case where an illumination instruction and a stop instruction are issued for the first lamp unit 24 independently from an illumination instruction and a stop instruction issued for the second lamp unit 26 in a vehicle lamp system according to a modification example. FIG. 4 corresponds to FIG. 3.

In the present modification example, the lamp controlling unit 20 drives the driving unit 36 of the first lamp unit 24 solely in accordance with an illumination instruction for the first lamp unit 24, regardless of whether the second lamp unit 26 is emitting a beam. Therefore, in the present modification example, the driving unit 36 is being stopped from time t1 to time t2 and from time t3 to time t4 because no illumination instruction is issued for the first lamp unit 24 although the second lamp unit 26 is emitting a beam. Meanwhile, in a case where a stop instruction is issued only for the first lamp unit 24 while both the first lamp unit 24 and the second lamp unit 26 are emitting a beam, the lamp controlling unit 20 instructs that the driving unit 36 be kept driven at the target rotation rate until a second duration $T_2$ longer than the first duration $T_1$ has passed. Then, the lamp controlling unit 20 keeps the driving unit 36 driven at the target rotation rate if an illumination instruction is issued for the first lamp unit 24 before the second duration $T_2$ has passed, or the lamp controlling unit 20 stops the driving unit if no illumination instruction is issued for the first lamp unit 24 before the second duration $T_2$ has passed. The lamp controlling unit 20 may instruct that the driving unit 36 be so driven as to keep rotating at a rotation rate lower than the target rotation rate (e.g., at a rotation rate one half the target value) until the second duration $T_2$ has passed since a stop instruction. Alternatively, the lamp controlling unit 20 may instruct that the driving unit 36 be driven such that the rotation rate of the driving unit 36 decreases gradually to bring the rotation rate of the driving unit 36 to substantially zero when the first duration $T_2$ has passed, for example.

Second Embodiment

Figure 5:
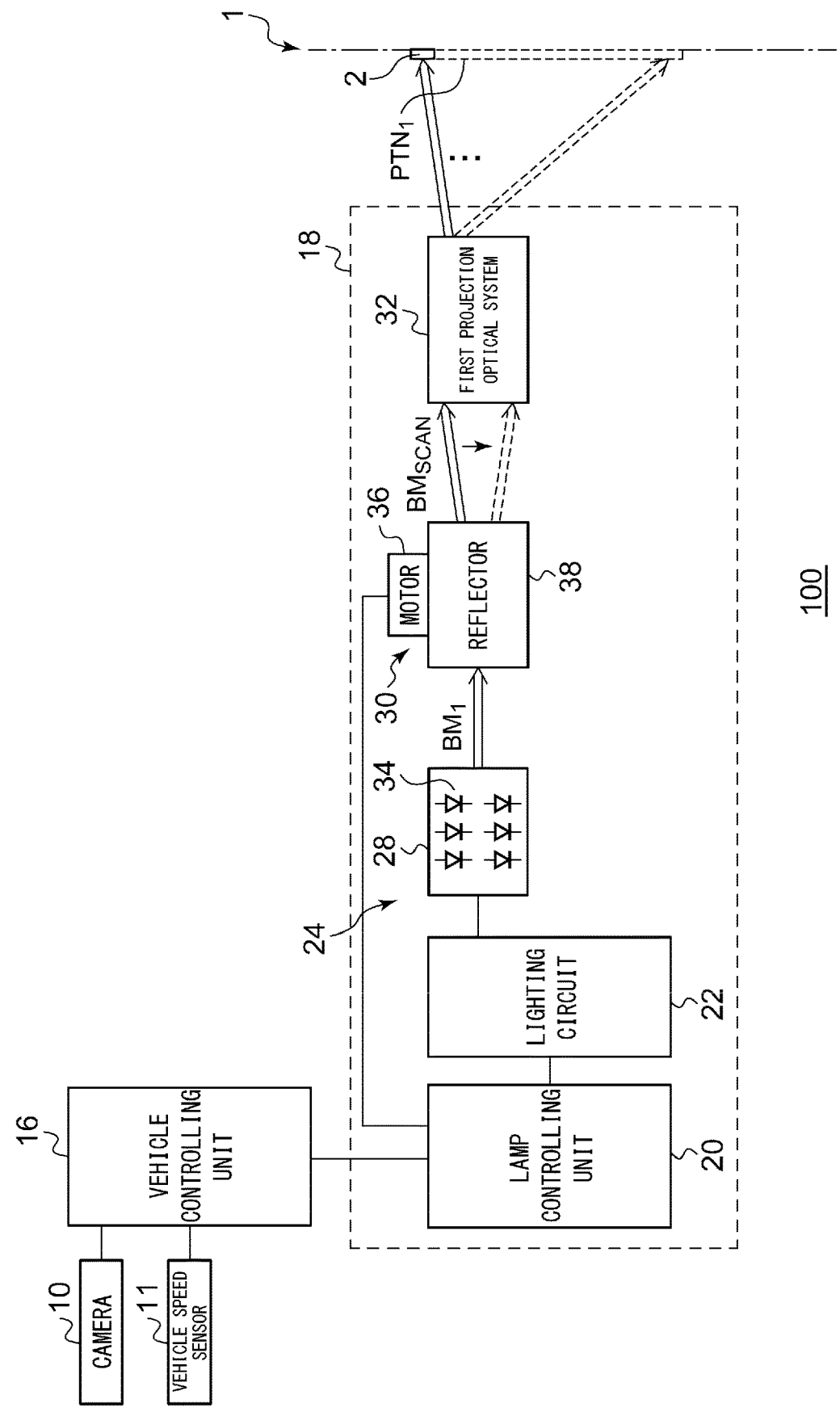
FIG. 5 is a schematic diagram illustrating a configuration of a vehicle lamp system that includes a vehicle lamp according to a second embodiment.

FIG. 5 is a schematic diagram illustrating a configuration of a vehicle lamp system 100 that includes a vehicle lamp 18 according to a second embodiment. The vehicle lamp system 100 includes a camera 10, a vehicle speed sensor 11, a vehicle controlling unit 16, and the vehicle lamp 18.

The camera 10 captures an image of a space in front of the vehicle. The vehicle speed sensor 11 detects the vehicle speed by detecting the rotation speed of wheels.

The vehicle controlling unit 16 integrally controls the vehicle. The vehicle controlling unit 16 according to the present embodiment is configured to be capable of executing ADB (Adaptive Driving Beam) control. The ADB control is executed in response to an execution instruction for the ADB control from a light switch (not illustrated), for example. The vehicle controlling unit 16 generates a light distribution command indicating a light distribution pattern to be formed in front of the vehicle based on information (traveling information) detected by the camera 10 and/or the vehicle speed sensor 11. For example, the vehicle controlling unit 16 detects any preceding vehicle, oncoming vehicle, pedestrian, or the like based on the traveling information and generates a light distribution command that sets a region where any preceding vehicle, oncoming vehicle, pedestrian, or the like has been detected as a non-illumination region. A non-illumination region refers to a region that is not illuminated with light or a region that is illuminated with light at a luminous intensity low enough not to cause glare. When the vehicle controlling unit 16 no longer detects any preceding vehicle, oncoming vehicle, pedestrian, or the like, the vehicle controlling unit 16 generates a light distribution command that sets (has changed) a region where no longer any preceding vehicle, oncoming vehicle, pedestrian, or the like is detected as (to) an illumination region.

The vehicle lamp 18 includes a lamp controlling unit 20, a lighting circuit 22, and a first lamp unit 24. The first lamp unit 24 is configured to be capable of illuminating a region that includes at least a portion of a high beam region. The first lamp unit 24 includes a first light source 28, a scan optical system 30, and a first projection optical system 32. The first light source 28 includes at least one light emitting unit 34. The light emitting unit 34 includes a semiconductor light source, such as an LED (light emitting diode) or an LD (laser diode).

The scan optical system 30 includes a motor 36 and a reflector 38 serving as a reflective body. The motor 36 is, for example, a brushless DC motor. The reflector 38 is attached to a rotor of the motor 36 and makes a rotary motion. The reflector 38 repeats the rotary motion and thus scans an exit beam $BM_1$ from the first light source 28 in the lateral direction. An exit beam from the scan optical system 30 will be referred to as a scan beam $BM_{SCAN}$. The scanning period of the scan optical system 30 is set to a range of 2-10 msec to prevent a flicker.

The first projection optical system 32 projects the scan beam $BM_{SCAN}$ scanned by the scan optical system 30 onto a virtual vertical screen 1 in front of the lamp and thus forms a first light distribution pattern $PTN_1$. A region illuminated by the scan beam $BM_{SCAN}$ at a given time will be referred to as an illumination region 2. The first light distribution pattern $PTN_1$ is formed as the illumination region 2 moves in the lateral direction over the virtual vertical screen 1.

The first projection optical system 32 can be constituted by a reflective optical system, a transmissive optical system, or a combination thereof. The first projection optical system 32 can be omitted if the divergence angle, the exit angle, and so on of the exit beam $BM_1$ from the first light source 28 are designed appropriately.

The lighting circuit 22 is configured to be capable of switching between on and off of the first light source 28.

The lamp controlling unit 20 controls the lighting circuit 22 in accordance with a light distribution command from the vehicle controlling unit 16 and thus turns on or off the first light source 28 of the first lamp unit 24. For example, the lamp controlling unit 20 can vary the luminous intensity in the illumination region 2 over time in synchronization with the scanning motion of the scan optical system 30. For example, setting the brightness of the first light source 28 to no higher than a predetermined value (e.g., zero) in a certain time segment within one scan period can make the region corresponding to that time segment a non-illumination region (off region). Conversely, raising the brightness of the first light source 28 in a certain time segment within one scan period allows the region corresponding to that time segment to be illuminated with a spotlight. The brightness of the first light source 28 may be controlled through the amount of driving current supplied to the light emitting unit 34, through the number of light emitting units 34 that are on, or through the combination thereof.

The lamp controlling unit 20 also controls the rotation rate of the motor 36 and in turn the rotation rate of the reflector 38. To the beam emitted from the first lamp unit 24 from flickering, the lamp controlling unit 20 turns on the first light source 28 while the rotation rate of the motor 36 is stable at a prescribed value. Specifically, the lamp controlling unit 20 turns on the first light source 28 immediately if the rotation rate of the motor 36 has stabilized at the prescribed value, that is, if the rotation rate has reached the prescribed value when the lamp controlling unit 20 has received an illumination instruction instructing the first lamp unit 24 to emit a beam. In contrast, if the rotation rate of the motor 36 has not stabilized at the prescribed value, that is, if the rotation rate has not reached the prescribed value (e.g., if the rotation rate is zero) when the lamp controlling unit 20 has received an illumination instruction, the lamp controlling unit 20 instructs that the motor 36 be driven to raise the rotation rate of the motor 36 and turns on the first light source 28 after the rotation rate of the motor 36 has stabilized at the prescribed value.

Figure 6:
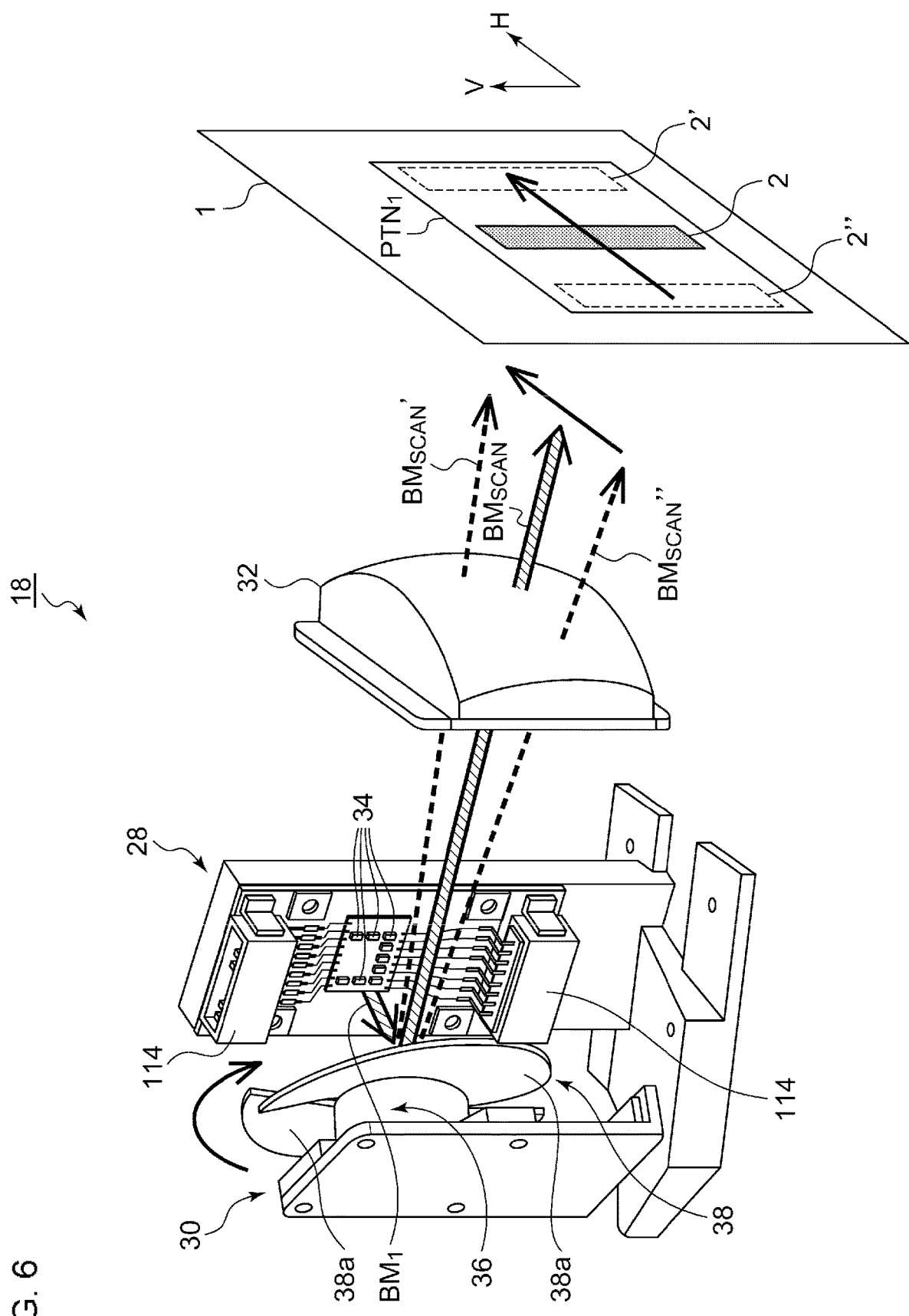
FIG. 6 is a perspective view of the lamp unit illustrated in FIG. 5.

Now, a more specific example of the configuration of the vehicle lamp 18 will be described. FIG. 6 is a perspective view of the first lamp unit 24.

As described above, the first light source 28 includes a plurality of light emitting units 34. The plurality of light emitting units 34 are coupled to the lighting circuit 22 (not illustrated in FIG. 6) via a connector 114. Each light emitting unit 34 constitutes a smallest unit for controlling the brightness and on/off thereof. Each light emitting unit 34 may be a single LED chip (LD chip) or may include a plurality of LED chips (LD chips) coupled in series and/or in parallel.

In the present embodiment, the reflector 38 includes two blades 38a and scans a scan beam $BM_{SCAN}$ twice per rotation of the motor 36. Therefore, the scanning frequency is twice the rotation rate of the motor 36. There is no particular limitation on the number of the blades 38a.

At a given time $t_0$, an exit beam $BM_1$ from the first light source 28 is reflected at an angle corresponding to the position of the reflector 38 (the angle of rotation of the rotor). The light reflected at that point, that is, a scan beam $BM_{SCAN}$ forms one illumination region 2 on the virtual vertical screen 1 in front of the vehicle. In FIG. 6, the illumination region 2 is illustrated as a rectangular region for simplifying the illustration, but the shape of the illumination region 2 is not limited to a rectangle.

Upon the position of the reflector 38 changing at another time $t_1$, the angle of reflection changes, and the light reflected at that point, that is, a scan beam $BM_{SCAN}'$ forms an illumination region 2'. Upon the position of the reflector 38 changing at yet another time $t_2$, the angle of reflection changes, and the light reflected at that point, that is, a scan beam $BM_{SCAN}$" forms an illumination region 2".

Rotating the scan optical system 30 at high speed causes the illumination region 2 to scan over the virtual vertical screen 1, and thus a first light distribution pattern $PIN_1$ is formed in front of the vehicle.

Figure 7A:
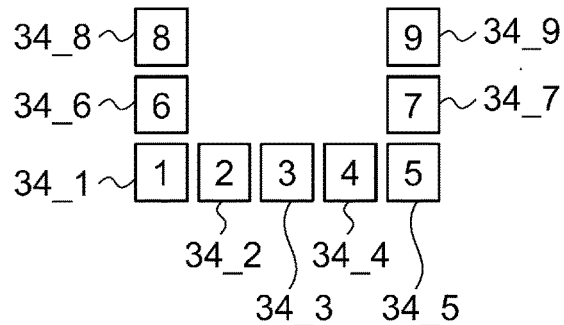
FIGS. 7A to 7C are illustrations for describing how a first light distribution pattern is formed.
Figure 7B:
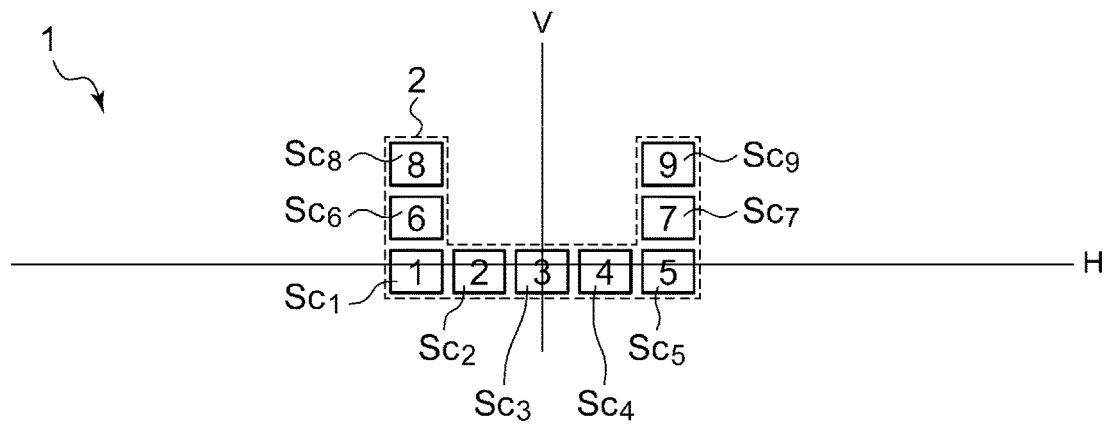
Figure 7C:
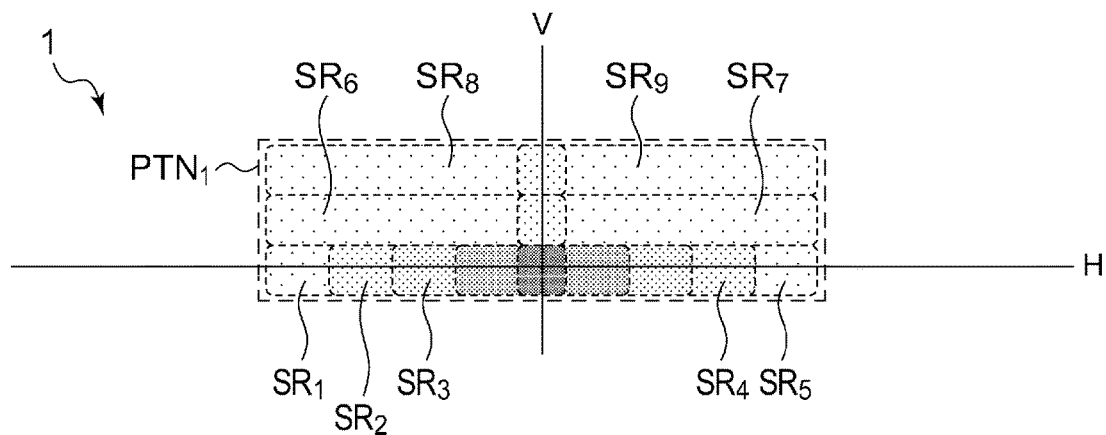

The above describes the configuration of the vehicle lamp 18. Now, an operation of the vehicle lamp 18 will be described. FIGS. 7(a) to 7(c) are illustrations for describing how a first light distribution pattern $PIN_1$ is formed.

FIG. 7(a) illustrates a layout of a plurality of light emitting units 34 in the first light source 28. In the present embodiment, the first light source 28 includes nine light emitting units 34_1 to 34_9 disposed in the U-shape.

FIG. 7(b) illustrates illumination spots formed on the virtual vertical screen 1 by exit light from the respective light emitting units 34 when the reflector 38 is at a predetermined position.

An illumination spot formed by a light emitting unit 34 will be referred to as a condensed spot Sc. The notation $Sc_i$ indicates a condensed spot formed by an ith light emitting unit 34_i ($1 \le i \le 9$). The set of a plurality of condensed spots $Sc_i$ to $Sc_9$ illustrated in FIG. 7 corresponds to the illumination region 2 illustrated in FIG. 6.

FIG. 7(c) illustrates regions (referred to as scan regions) SR over which the respective condensed spots Sc pass when the reflector 38 is rotated. The notation $SR_i$ indicates a region over which an ith condensed spot $Sc_i$ passes. The set of scan regions $SR_1$ to $SR_9$ corresponds to a first light distribution pattern $PTN_1$.

Figure 8A:
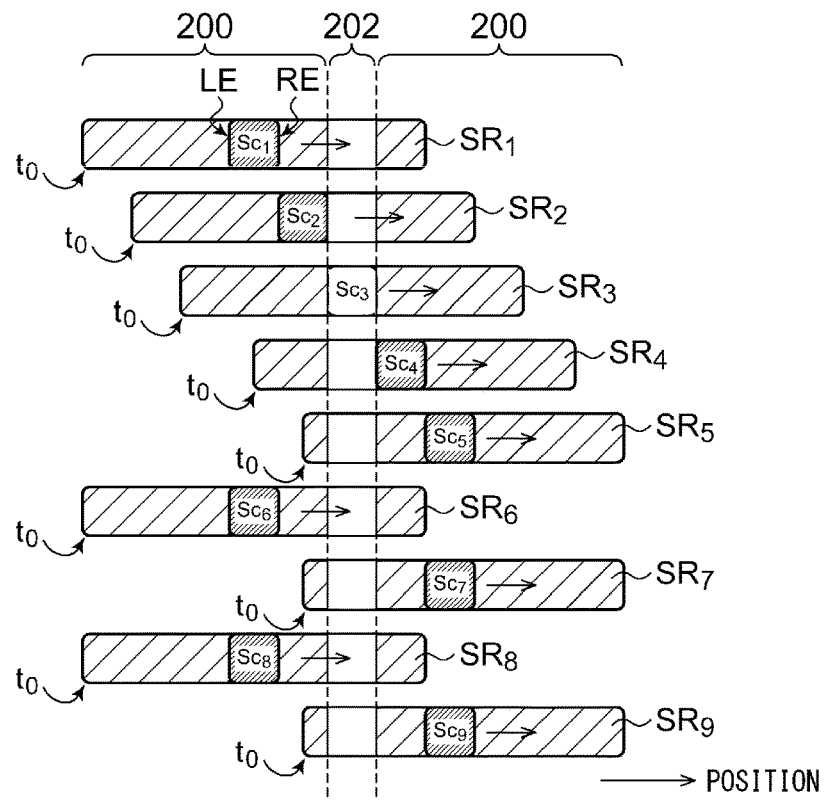
FIGS. 8A and 8B are illustrations for describing how a non-illumination region (off region) is formed.
Figure 8B:
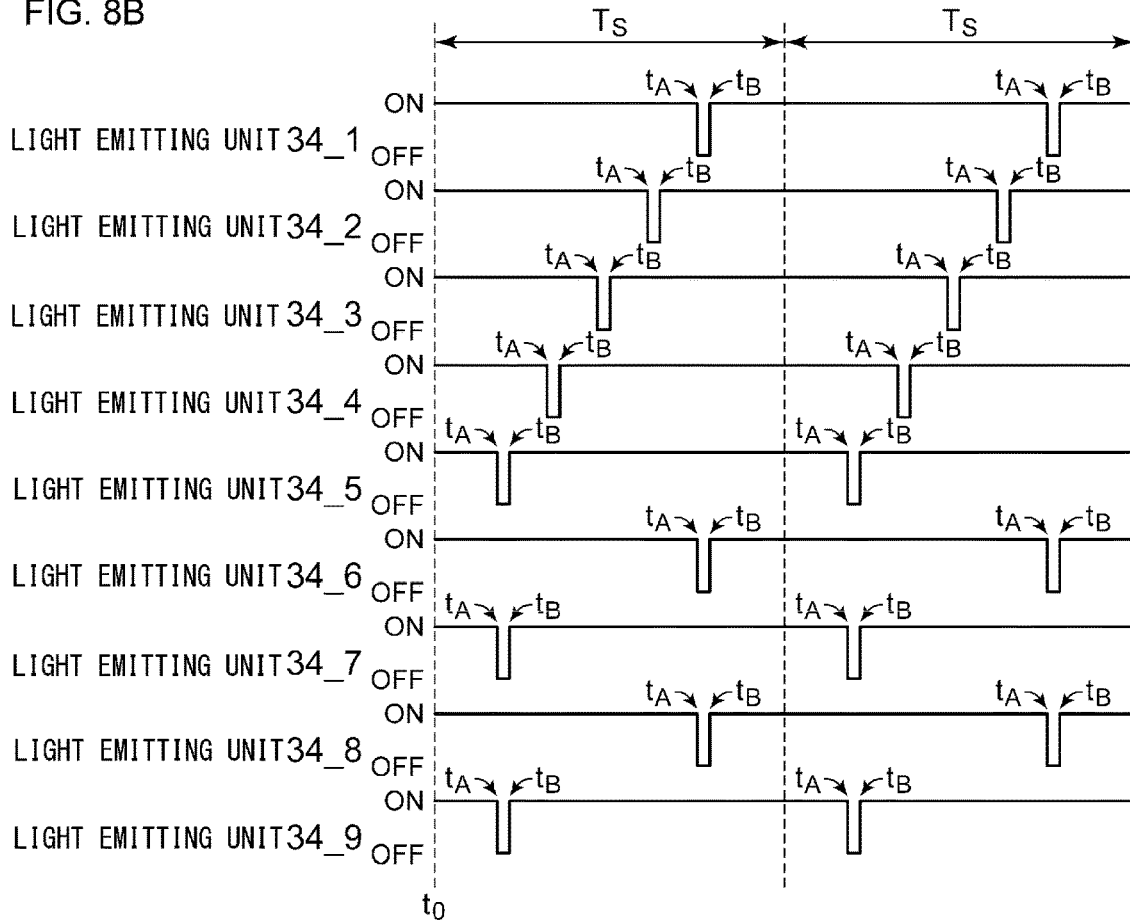

FIGS. 8(a) to 8(c) are illustrations for describing how a non-illumination region (off region) is formed. FIG. 8(a) illustrates the plurality of scan regions $SR_1$ to $SR_9$ offset from one another for better visualization. FIG. 8(b) is a timing chart illustrating an on/off state of each of the plurality of light emitting units 34. Of each scan region SR, a region with hatching corresponds to an illumination region 200, and a region with no hatching corresponds to a non-illumination region 202. Ts represents a scanning period.

$Sc_1$ to $Sc_9$ indicate the positions of the respective condensed spots at a given time. Each condensed spot Sc is scanned from left to right in FIG. 8(a). The assumption is that the left end LE of a condensed spot $Sc_i$ is located at the left end of a scan region $SR_i$ at a given time $t_0$.

The lamp controlling unit 20 sets the brightness of the light emitting unit 34 corresponding to a condensed spot $Sc_i$ to no higher than a predetermined value (e.g., zero) during a period in which the condensed spot $Sc_i$ passes over the non-illumination region 202. Specifically, the lamp controlling unit 20 sets the brightness of the light emitting unit 34 to no higher than the predetermined value at timing $t_A$ at which the right end RE of the condensed spot $Sc_i$ reaches the non-illumination region 202. In addition, the lamp controlling unit 20 sets the brightness of the light emitting unit 34 higher than the predetermined value at timing $t_B$ at which the left end LE of the condensed spot $Sc_i$ reaches the right end of the non-illumination region 202. This control makes it possible to form the non-illumination region 202.

Now, a changeover from a non-illumination region 202 to an illumination region 200 will be described.

Figure 9A:
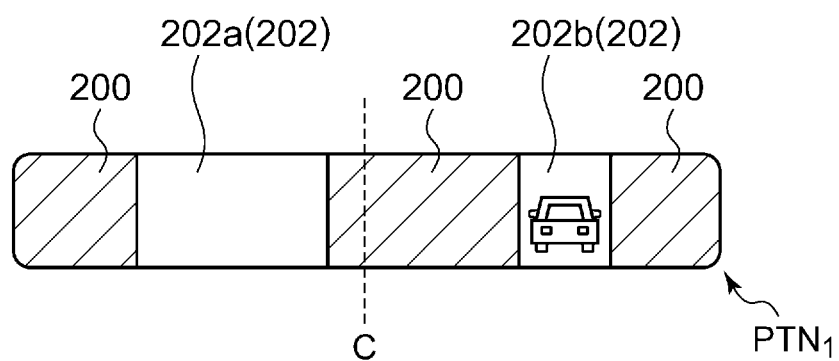
FIGS. 9A to 9C are illustrations for describing how a non-illumination region is changed over to an illumination region.
Figure 9B:
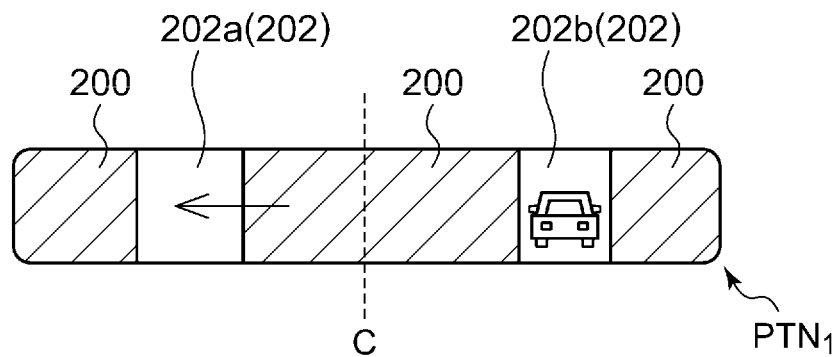
Figure 9C:
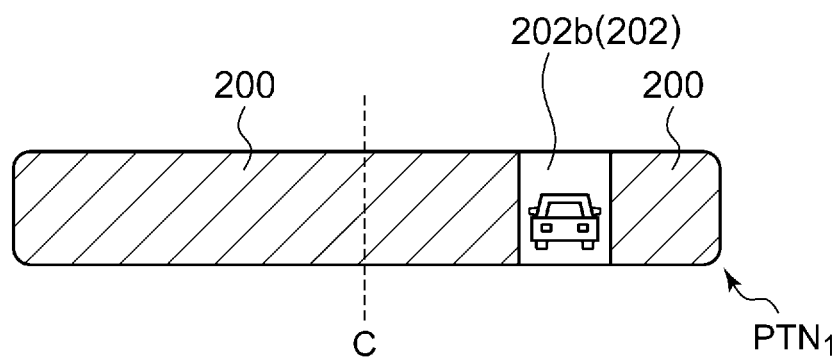

FIGS. 9(a) to 9(c) are illustrations for describing how a non-illumination region 202 is changed over to an illumination region 200. In the case illustrated in FIGS. 9(a) to 9(c), one non-illumination region 202, or in this example, a non-illumination region 202a, which is one of two non-illumination regions 202a and 202b, is changed over to an illumination region 200. FIG. 9(a) illustrates a first light distribution pattern $PTN_1$ held when the changeover from the non-illumination region 202a to the illumination region 200 is started. FIG. 9(b) illustrates a first light distribution pattern $PTN_1$ held in the middle of the changeover from the non-illumination region 202a to the illumination region 200. FIG. 9(c) illustrates a first light distribution pattern $PTN_1$ held when the changeover from the non-illumination region 202a to the illumination region 200 has finished.

When changing the non-illumination region 202 over to the illumination region 200, the lamp controlling unit 20 starts changing the non-illumination region 202 over to the illumination region 200 from, of the two ends (the right end and the left end) of the non-illumination region 202 in the vehicle-width direction, one end that is closer to a center portion C (in the direct front of the host vehicle) of the first light distribution pattern $PTN_1$ and changes gradually toward the other end that is farther from the center portion C. Specifically, the lamp controlling unit 20 reduces the size of the non-illumination region 202 gradually scan by scan, that is, pushes back the timing $t_A$ at which the brightness of the light emitting unit 34 corresponding to the condensed spot $Sc_i$ is set to no higher than a predetermined value gradually scan by scan to thus reduce the period in which the brightness is kept no higher than the predetermined value gradually.

The lamp controlling unit 20 changes the entire non-illumination region 202 over to the illumination region 200 in a constant changeover time, regardless of the size of the non-illumination region 202, that is, regardless of the width of the non-illumination region 202 in the vehicle-width direction. This changeover time is set to a range of 100-1000 msec, for example.

The lamp controlling unit 20 changes the non-illumination region 202 over to the illumination region 200 with the rate at which the non-illumination region 202 is changed over to the illumination region 200 (referred to below as a "changeover rate") kept constant during the changeover. In other words, the lamp controlling unit 20 changes the non-illumination region 202 over to the illumination region 200 with the size by which the non-illumination region 202 is reduced in each scan kept constant during the changeover. In this case, if the angular range of the non-illumination region 202 is $\theta_B$, the scanning period is Ts, and the changeover time is Tc, the non-illumination region 202 is changed over to the illumination region 200 in (Tc/Ts) scans, and the non-illumination region 202 is reduced by $\theta_B \times (Ts/Tc)$ in each scan (i.e., changed over to the illumination region 200).

Figure 10A:
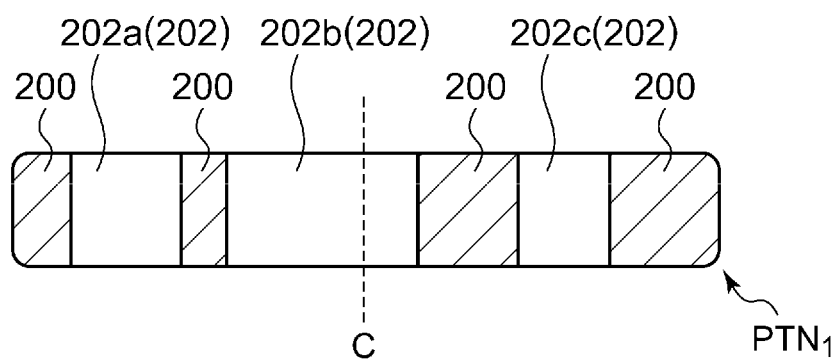
FIGS. 10A to 10C are illustrations for describing how a non-illumination region is changed over to an illumination region.
Figure 10B:
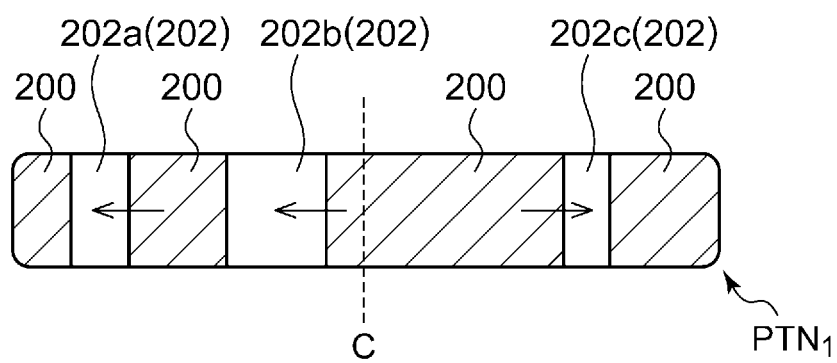
Figure 10C:
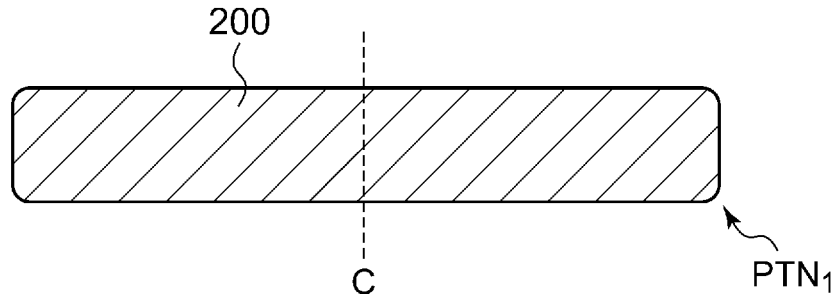

FIGS. 10(a) to 10(c) are also illustrations for describing how a non-illumination region 202 is changed over to an illumination region 200. In the case illustrated in FIGS. 10(a) to 10(c), a plurality of non-illumination regions 202, or in this example, three non-illumination regions 202a, 202b, and 202c are each changed over to an illumination region 200 substantially simultaneously. FIGS. 10(a) to 10(c) correspond to FIGS. 9(a) to 9(c), respectively.

Even when the plurality of non-illumination regions 202 are to be changed over to the illumination region 200, the lamp controlling unit 20 changes each non-illumination region 202 over to the illumination region 200 in a manner similar to that in the case where the lamp controlling unit 20 changes one non-illumination region 202 over to the illumination region 200. Specifically, for each non-illumination region 202, the lamp controlling unit 20 starts changing the non-illumination region 202 over to the illumination region 200 from, of the two ends in the vehicle-width direction, one end that is closer to the center portion C of the first light distribution pattern $PTN_1$ and changes gradually toward the end that is farther from the center portion C. In the example illustrated in FIG. 10(a), the right ends of the non-illumination regions 202a and 202b are closer to the center portion C, and thus the non-illumination regions 202a and 202b each start being changed over to the illumination region 200 from the right end and gradually toward the left end. Meanwhile, the left end of the non-illumination region 202c is closer to the center portion C, and thus, unlike the non-illumination regions 202a and 202b, the non-illumination region 202c starts being changed over to the illumination region 200 from the left end and gradually toward the right end. The lamp controlling unit 20 changes each of the entire non-illumination regions 202 over to the illumination region 200 in a constant changeover time, regardless of the size of the non-illumination region 202, that is, regardless of the width of the non-illumination region 202 in the vehicle-width direction. Therefore, the non-illumination regions 202 are each changed over to the illumination region 200 in the same changeover time even when the non-illumination regions 202 differ from each other in size, for example.

With the vehicle lamp 18 according to the present embodiment described above, when a non-illumination region 202 is changed over to an illumination region 200, the non-illumination region 202 starts being changed over to the illumination region 200 from, of the two ends of the non-illumination region 202 in the vehicle-width direction, one end that is closer to the center portion C of the first light distribution pattern $PTN_1$ and gradually toward the other end that is farther from the center portion C. With this configuration, when a non-illumination region 202 is to be changed over to an illumination region 200 as a preceding vehicle has made a left turn or a right turn and disappeared from the front of the host vehicle or as an oncoming vehicle has passed by the host vehicle and disappeared from the front of the host vehicle, the non-illumination region 202 is changed over to the illumination region 200 in a direction in which the preceding vehicle or the oncoming vehicle disappears. Therefore, for example, as compared with a case where the non-illumination region 202 is changed over to the illumination region 200 in a direction opposite to the aforementioned direction or a case where the non-illumination region 202 is changed over to the illumination region 200 from the two ends of the non-illumination region 202 in the vehicle-width direction toward the center of the non-illumination region 202, any discomfort that could be felt by the driver can be reduced, and the safety and comfort for the driver can be increased.

With the vehicle lamp 18 according to the present embodiment, an entire non-illumination region 202 is changed over to an illumination region 200 in a constant changeover time, regardless of the size of the non-illumination region 202. If the changeover time varies depending on the size of the non-illumination region 202, the vehicle controlling unit 16 cannot determine whether the changeover from the non-illumination region 202 to the illumination region 200 has finished and cannot issue the next instruction. In this respect, the vehicle lamp 18 according to the present embodiment can make the changeover in the constant changeover time as described above, which keeps the above problem from arising.

Moreover, with the vehicle lamp 18 according to the present embodiment, the changeover time in which a non-illumination region 202 is changed over to an illumination region 200 is set to a range of 100-1000 msec. As long as the changeover time is within this range, a rapid change in the brightness in the space in front of the vehicle can be suppressed, and the safety and comfort for the driver can be increased.

Thus far, one aspect of the present invention has been described based on the second embodiment. Now, some modification examples associated with the second embodiment will be described.

First Modification Example

In the case described in the second embodiment, when changing a non-illumination region 202 over to an illumination region 200, the lamp controlling unit 20 starts changing the non-illumination region 202 over to the illumination region 200 from, of the two ends of the non-illumination region 202 in the vehicle-width direction, one end that is closer to the center portion C of the first light distribution pattern $PTN_1$ and changes gradually toward the other end that is farther from the center portion C. This, however, is not a limiting example. When changing a non-illumination region 202 over to an illumination region 200, the lamp controlling unit 20 may start changing the non-illumination region 202 over to the illumination region 200 from, of the two ends of the non-illumination region 202 in the vehicle-width direction, one end that is farther from the center portion C of the first light distribution pattern $PIN_1$ and change gradually toward the other end that is closer to the center portion C. In other words, when changing a non-illumination region 202 over to an illumination region 200, it suffices that the lamp controlling unit 20 start changing the non-illumination region 202 to the illumination region 200 gradually from one end toward the other end of the non-illumination region 202 in the vehicle-width direction, that is, from the left toward the right or from the right toward the left. In this case, the safety and comfort for the driver can be increased in various conditions.

Second Modification Example

In the case described in the second embodiment, the changeover rate remains constant during the changeover from a non-illumination region 202 to an illumination region 200. This, however, is not a limiting example, and the changeover rate may change during the changeover from a non-illumination region 202 to an illumination region 200.

For example, as with the non-illumination region 202b illustrated in FIG. 10 (a), if a non-illumination region 202 includes the center portion C of the first light distribution pattern $PTN_1$, a first rate at which the non-illumination region 202 is changed over to the illumination region 200 up to the center portion C may differ from a second rate at which the non-illumination region 202 is changed over to the illumination region 200 past the center portion C. In one example, the first rate may be higher than the second rate. In other words, the non-illumination region 202 may be changed over to the illumination region 200 up to the center portion C at a relatively high rate, and the non-illumination region 202 may be changed over to the illumination region 200 past the center portion C at a relatively low rate. In contrast, as with the non-illumination regions 202a and 202c illustrated in FIG. 10 (a), if a non-illumination region 202 does not include the center portion C of the first light distribution pattern $PTN_1$, the changeover rate does not need to be changed during the changeover from the non-illumination region 202 to the illumination region 200. According to the present modification example, the center portion C of the first light distribution pattern $PIN_1$ that the driver wants to see the most while driving, that is, the center of the road can be illuminated relatively quickly, and this helps increase the safety and comfort for the driver.

Third Embodiment

Figure 11:
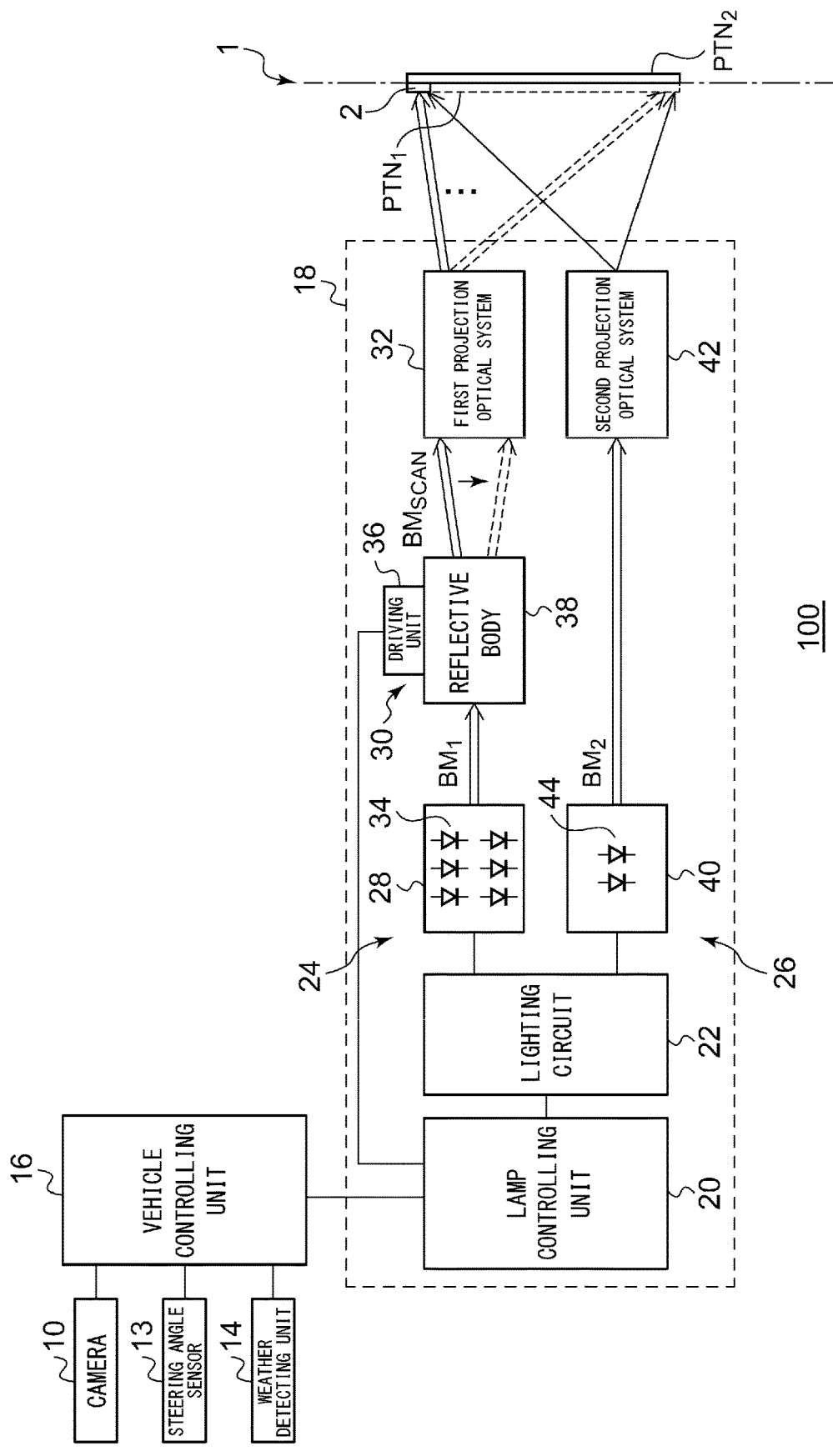
FIG. 11 is a schematic diagram illustrating a configuration of a vehicle lamp system that includes a vehicle lamp according to a third embodiment.

FIG. 11 is a schematic diagram illustrating a configuration of a vehicle lamp system 100 that includes a vehicle lamp 18 according to a third embodiment. The vehicle lamp system 100 includes a camera 10, a steering angle sensor 13, a weather detecting unit 14, a vehicle controlling unit 16, and the vehicle lamp 18.

The camera 10 captures an image of a space in front of the vehicle. The steering angle sensor 13 detects the steering angle of the steering wheel.

The weather detecting unit 14 detects the current weather in the surroundings of the vehicle. Specifically, the weather detecting unit 14 determines at least whether the current weather in the surroundings of the vehicle is a normal weather (e.g., sunny or cloudy) or the current weather in the surroundings of the vehicle is a bad weather (e.g., rainy, snowy, or foggy).

For example, the weather detecting unit 14 may include a weather sensor (e.g., raindrop sensor or fog sensor) that detects the weather in the surroundings of the vehicle and detect the current weather in the surroundings of the vehicle based on the detection result of the weather sensor. In addition, for example, the weather detecting unit 14 may be configured to detect an operation state (e.g., on/off of a wiper) of a device (e.g., wiper) that is operated manually or automatically in accordance with the current weather in the surroundings of the vehicle and detect the current weather in the surroundings of the vehicle based on the detection result of the operation state. In addition, for example, the weather detecting unit 14 may be configured to receive information indicating the current weather in the surroundings of the vehicle from the outside and detect the current weather in the surroundings of the vehicle based on the received information.

The vehicle controlling unit 16 integrally controls the vehicle. The vehicle controlling unit 16 generates a light distribution command indicating a light distribution pattern to be formed in front of the vehicle and the luminous intensity distribution of the light distribution pattern based on the information from at least one of the camera 10, the steering angle sensor 13, and the weather detecting unit 14. The vehicle controlling unit 16 may reflect information other than the above, such as the vehicle speed, on determining the light distribution pattern.

The vehicle lamp 18 includes a lamp controlling unit 20, a lighting circuit 22, a first lamp unit 24 that illuminates a high beam region, and a second lamp unit 26 that illuminates a low beam region.

The first lamp unit 24 is a lamp unit of a scan method and includes a first light source 28, a scan optical system 30, and a first projection optical system 32. The first light source 28 includes a plurality of light emitting units 34. The light emitting unit 34 includes a semiconductor light source, such as an LED (light emitting diode) or an LD (laser diode).

The scan optical system 30 includes a driving unit 36 and a reflective body 38. The driving unit 36 is a motor in the present embodiment and is, for example, a brushless DC motor. The reflective body 38 is a reflector or is more specifically a rotary reflector in the present embodiment. The reflective body 38 is attached to a rotor of the driving unit 36 and makes a rotary motion. The reflective body 38 repeats the rotary motion and thus scans an exit beam $BM_1$ from the first light source 28 in the lateral direction. An exit beam from the scan optical system 30 will be referred to as a scan beam $BM_{SCAN}$. The scanning frequency of the scan optical system 30 is set to no lower than 60 Hz or set, for example, to around 200 Hz in order to prevent a flicker.

The first projection optical system 32 projects the scan beam $BM_{SCAN}$ scanned by the scan optical system 30 onto a virtual vertical screen 1 in front of the lamp and thus forms a first light distribution pattern $PTN_1$. A region illuminated by the scan beam $BM_{SCAN}$ at a given time will be referred to as an illumination region 2. The first light distribution pattern $PTN_1$ is formed as the illumination region 2 moves in the lateral direction over the virtual vertical screen 1.

The first projection optical system 32 can be constituted by a reflective optical system, a transmissive optical system, or a combination thereof. The first projection optical system 32 can be omitted if the divergence angle, the exit angle, and so on of the exit beam $BM_1$ from the first light source 28 are designed appropriately.

The second lamp unit 26 includes a second light source 40 and a second projection optical system 42. The second light source 40 includes at least one light emitting unit 44. The light emitting unit 44 includes a semiconductor light source, such as an LED (light emitting diode) or an LD (laser diode).

The second projection optical system 42 projects an exit beam $BM_2$ from the second light source 40 onto the virtual vertical screen 1 and thus forms a second light distribution pattern $PTN_2$ substantially vertically below the first light distribution pattern $PTN_1$. The second projection optical system 42 can be constituted by a reflective optical system, a transmissive optical system, or a combination thereof.

The lighting circuit 22 supplies a driving current to the first light source 28 and/or the second light source 40 in accordance with an instruction from the lamp controlling unit 20.

The lamp controlling unit 20 controls the lighting circuit 22 in accordance with a light distribution command from the vehicle controlling unit 16 and thus turns on or off the first light source 28 of the first lamp unit 24. For example, the lamp controlling unit 20 can set the brightness of the first light source 28 to zero in a certain time segment within one scan period to allow the light to be blocked in the region corresponding to that time segment.

The lamp controlling unit 20 also controls the rotation rate of the driving unit 36 and in turn the rotation rate of the reflective body 38. To keep the beam emitted from the first lamp unit 24 from flickering, the lamp controlling unit 20 turns on the first light source 28 while the rotation rate of the driving unit 36 is stable at a prescribed value. Specifically, the lamp controlling unit 20 turns on the first light source 28 immediately if the rotation rate of the driving unit 36 has stabilized at the prescribed value, that is, if the rotation rate has reached the prescribed value when the lamp controlling unit 20 has received an illumination instruction instructing the first lamp unit 24 to emit a beam. In contrast, if the rotation rate of the driving unit 36 has not stabilized at the prescribed value, that is, if the rotation rate has not reached the prescribed value (e.g., if the rotation rate is zero) when the lamp controlling unit 20 has received an illumination instruction, the lamp controlling unit 20 instructs that the driving unit 36 be driven to raise the rotation rate of the driving unit 36 and turns on the first light source 28 after the rotation rate of the driving unit 36 has stabilized at the prescribed value.

The lamp controlling unit 20 also controls the lighting circuit 22 in accordance with a light distribution command from the vehicle controlling unit 16 and thus supplies a constant driving current to the second light source 40 to keep the brightness of the second light source 40 constant independent of the scanning motion of the scan optical system 30.

The first lamp unit 24 will be described in more concrete terms. The first lamp unit 24 is basically the same as the first lamp unit 24 according to the second embodiment, and thus FIG. 6 will be referred to.

As described above, the first light source 28 includes a plurality of light emitting units 34. The plurality of light emitting units 34 are coupled to the lighting circuit 22 (not illustrated in FIG. 6) via a connector 114. Each light emitting unit 34 constitutes a smallest unit for controlling the brightness and on/off thereof. Each light emitting unit 34 may be a single LED chip (LD chip) or may include a plurality of LED chips (LD chips) coupled in series and/or in parallel.

In the present embodiment, the reflective body 38 includes two blades 38a and scans a scan beam $BM_{SCAN}$ twice per rotation of the driving unit 36. Therefore, the scanning frequency is twice the rotation rate of the driving unit 36. There is no particular limitation on the number of the blades 38a.

At a given time $t_1$, an exit beam $BM_1$ from the first light source 28 is reflected at an angle corresponding to the position of the reflective body 38 (the angle of rotation of the rotor), and the light reflected at that point, that is, the scan beam $BM_{SCAN}$ forms one illumination region 2 on the virtual vertical screen 1 in front of the vehicle. In FIG. 6, the illumination region 2 is illustrated as a rectangular region for simplifying the illustration, but the shape of the illumination region 2 is not limited to a rectangle.

Upon the position of the reflective body 38 changing at another time $t_1$, the angle of reflection changes, and the light reflected at that point, that is, a scan beam $BM_{SCAN}'$ forms an illumination region 2'. Upon the position of the reflective body 38 changing at yet another time $t_2$, the angle of reflection changes, and the light reflected at that point, that is, a scan beam $BM_{SCAN}''$ forms an illumination region 2''.

Rotating the scan optical system 30 at high speed causes the illumination region 2 to scan over the virtual vertical screen 1, and thus a first light distribution pattern $PTN_1$ is formed in front of the vehicle.

With reference to FIGS. 7(a) to 7(c), the light emitting units 34 will be described in more concrete terms.

In the present embodiment, the light emitting units 34 that illuminate the same height are classified into the same channel so that the same amount of driving current will be supplied to these light emitting units 34. Specifically, the light emitting units 34 are classified as follows.

first channel: light emitting units 34_1, 34_2
second channel: light emitting unit 34_3
third channel: light emitting units 34_4, 34_5
fourth channel: light emitting units 34_6, 34_7
fifth channel: light emitting units 34_8, 34_9

The lamp controlling unit 20 can turn on each light emitting unit 34 separately from one another and, in particular, can separately set an on period of each light emitting element 34 within one scan period in synchronization with the periodic motion of the reflective body 38. In one modification example, the lamp controlling unit 20 may turn on the light emitting units 34 on a group by group basis (e.g., on a channel by channel basis) and set an on period in one scan period on a group by group basis.

In the present embodiment, the driving current supplied to each light emitting unit 34 in an on state does not change (i.e., stays constant) at least within one scan period. In other words, the brightness of each light emitting unit 34 in an on state does not change at least within one scan period. In this case, the luminous intensity of each scan region $SR_i$ is substantially uniform in the horizontal direction.

Figure 12A:
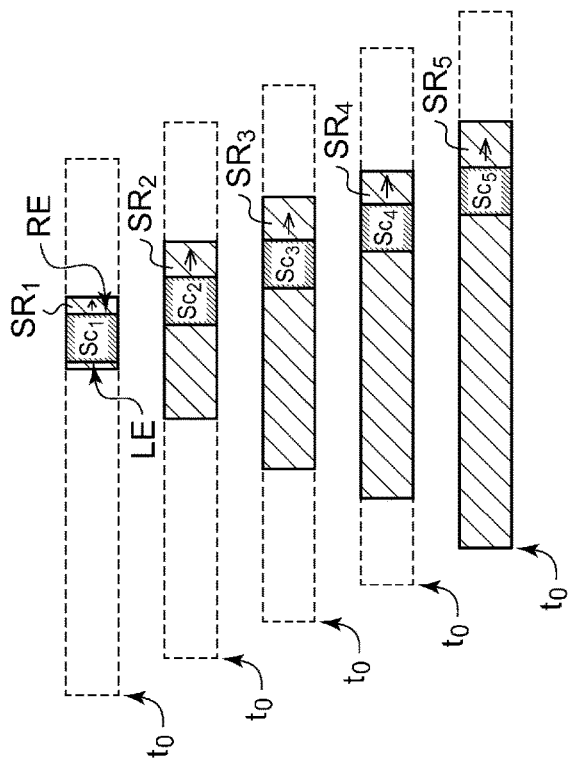
FIGS. 12A and 12B are illustrations for describing how a light distribution pattern is formed by a first lamp unit.
Figure 12B:
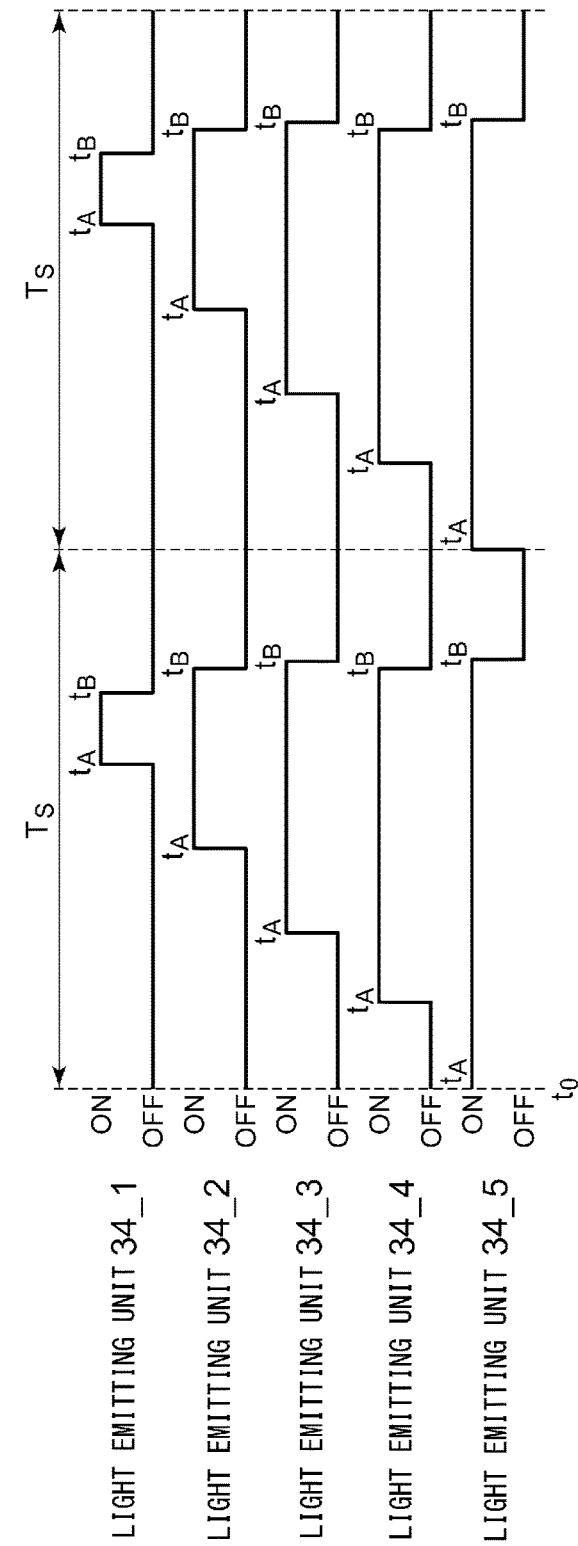

FIGS. 12(a) and 12(b) are illustrations for describing how a light distribution pattern is formed by the first lamp unit 24. In this example, how a light distribution pattern is formed in the vicinity of the H line by the lowermost light emitting units 34_1 to 34_5 will be described. FIG. 12(a) illustrates scan regions $SR_1$ to $SR_5$ formed by the respective light emitting units 34 offset from one another for better visualization. FIG. 12(b) is a timing chart illustrating an on/off state of each of the plurality of light emitting units 34. Ts represents a scanning period.

$Sc_1$ to $Sc_5$ indicate the positions of the condensed spots at a given time. Each condensed spot Sc is scanned from left to right in FIG. 12(a).

For each of the light emitting unit 34_1 to the light emitting unit 34_5, the lamp controlling unit 20 turns on the light emitting unit 34_i at timing $t_A$ at which the left end LE of the condensed spot $Sc_i$ reaches the left end of a region to serve as the scan region $SR_i$, and turns off the light emitting unit 34_i at timing $t_B$ at which the right end RE of the condensed spot $Sc_i$ reaches the right end of the region to serve as the scan region $SR_i$. This control makes it possible to form a light distribution pattern corresponding to the set of scan regions $SR_1$ to $SR_5$, that is, a light distribution pattern corresponding to a light distribution command.

Now, a change in the luminous intensity distribution of a light distribution pattern will be described.

Figure 13A:
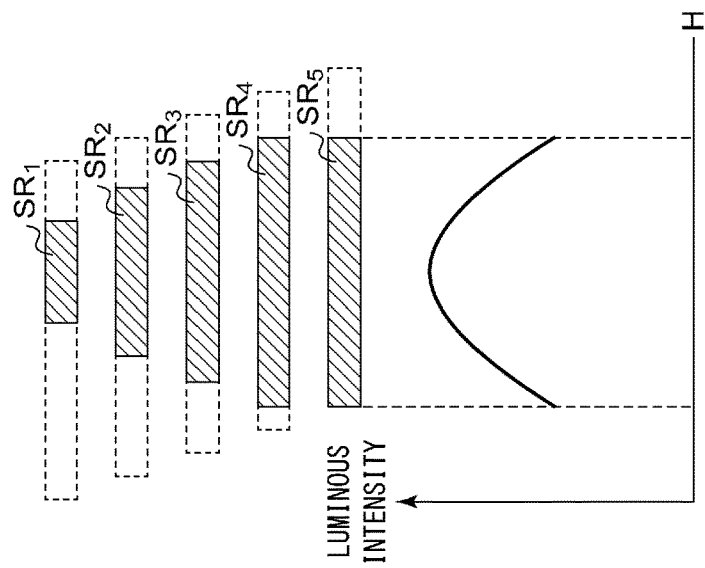
FIGS. 13A to 13C are illustrations for describing an example of a change in the luminous intensity distribution of a light distribution pattern.
Figure 13B:
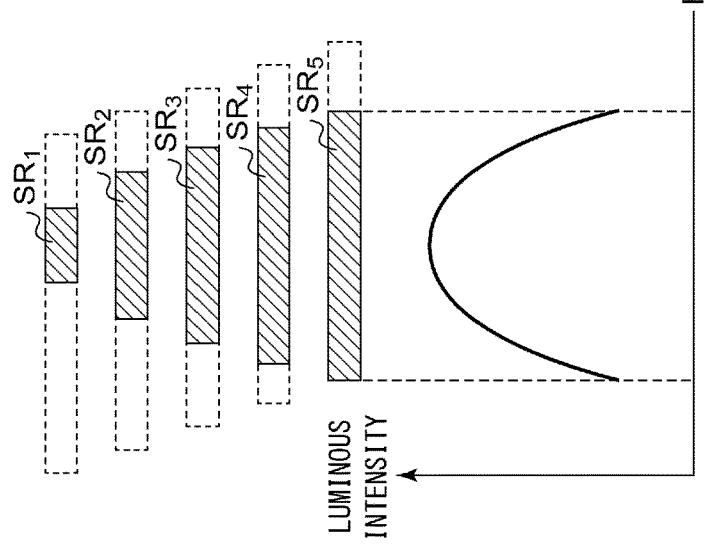
Figure 13C:
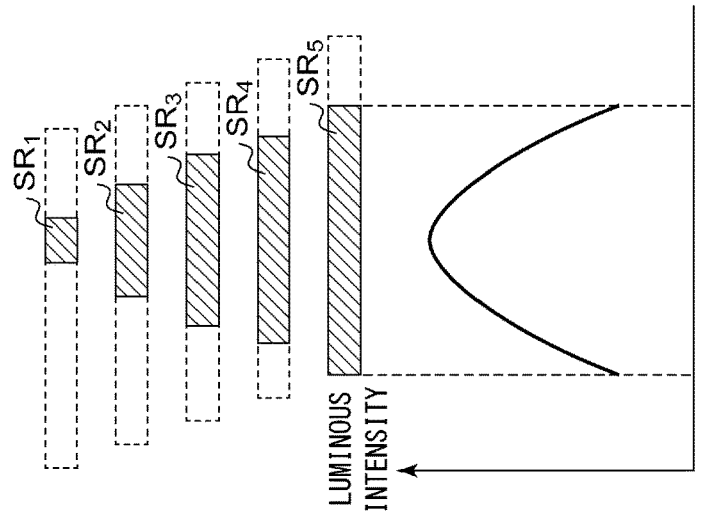

FIGS. 13(a) to 13(c) are illustrations for describing an example of a change in the luminous intensity distribution of a light distribution pattern. In this example, a change in the luminous intensity distribution of a light distribution pattern formed in the vicinity of the H line by the lowermost light emitting units 34_1 to 34_5 will be described.

The scan regions $SR_1$ to $SR_5$ formed by the lowermost light emitting units 34_1 to 34_5 in one scan are illustrated in the upper part of FIG. 13(a), and the luminous intensity distribution, in the horizontal direction, of the light distribution pattern formed in the vicinity of the H line by the lowermost light emitting units 34_1 to 34_5 in the stated scan are illustrated in the lower part of FIG. 13(a).

FIG. 13(b) illustrates the scan regions $SR_1$ to $SR_5$ formed by the lowermost light emitting units 34_1 to 34_5 in a scan performed after the scan illustrated in FIG. 13(a)—for example, in the next scan after the scan illustrated in FIG. 13(a), and the luminous intensity distribution, in the horizontal direction, of the light distribution pattern formed in the vicinity of the H line by the lowermost light emitting units 34_1 to 34_5 in the stated scan are illustrated in the lower part of FIG. 13(b).

FIG. 13(c) illustrates the scan regions $SR_1$ to $SR_5$ formed by the lowermost light emitting units 34_1 to 34_5 in a scan performed after the scan illustrated in FIG. 13(b)—for example, in the next scan after the scan illustrated in FIG. 13(b), and the luminous intensity distribution, in the horizontal direction, of the light distribution pattern formed in the vicinity of the H line by the lowermost light emitting units 34_1 to 34_5 in the stated scan are illustrated in the lower part of FIG. 13(c).

In this example, the lamp controlling unit 20 sets an on period of each of the light emitting units 34_1 to 34_4 within one scan period longer in the scan illustrated in FIG. 13(b) than in the scan illustrated in FIG. 13(a) and longer in the scan illustrated in FIG. 13(c) than in the scan illustrated in FIG. 13(b). Specifically, the lamp controlling unit 20 turns on each of the light emitting units 34_1 to 34_4 at an earlier timing in the scan illustrated in FIG. 13 (*b*) than in the scan illustrated in FIG. 13 (*a*) and turns off each of the light emitting units 34_1 to 34_4 at a later timing in the scan illustrated in FIG. 13 (*b*) than in the scan illustrated in FIG. 13 (*a*). In addition, the lamp controlling unit 20 turns on each of the light emitting units 34_1 to 34_4 at an earlier timing in the scan illustrated in FIG. 13 (*c*) than in the scan illustrated in FIG. 13 (*b*) and turns off each of the light emitting units 34_1 to 34_4 at a later timing in the scan illustrated in FIG. 13(*c*) than in the scan illustrated in FIG. 13 (*b*).

With this control, as illustrated in FIGS. 13(*a*) to 13 (*c*), the scan regions $SR_1$ to $SR_4$ in the scan illustrated in FIG. 13 (*b*) spread further to the right and the left than the respective scan regions $SR_1$ to $SR_4$ in the scan illustrated in FIG. 13 (*a*). In addition, the scan regions $SR_1$ to $SR_4$ in the scan illustrated in FIG. 13 (*c*) spread further to the right and the left than the respective scan regions $SR_1$ to $SR_4$ in the scan illustrated in FIG. 13 (*b*). Then, as illustrated in FIGS. 13 (*a*) to 13 (*c*), a luminous intensity distribution in which the luminous intensity changes relatively sharply in the horizontal direction is changed to a luminous intensity distribution in which the luminous intensity changes relatively gently in the horizontal direction.

Figure 14A:
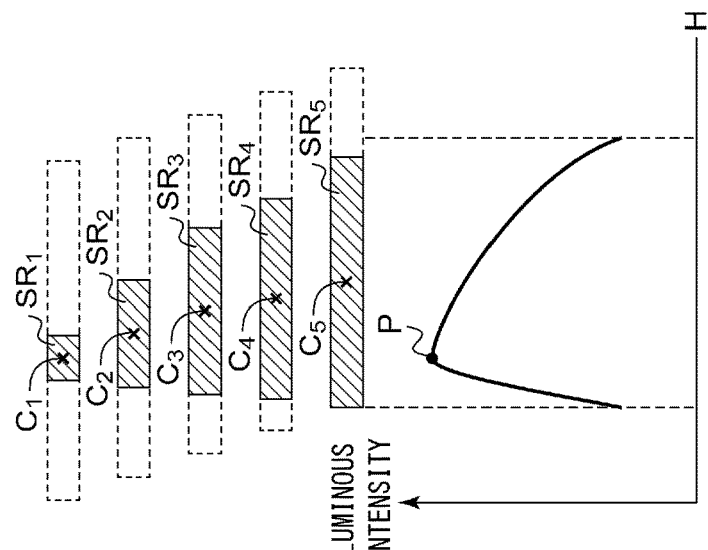
FIGS. 14A to 14C are illustrations for describing another example of a change in the luminous intensity distribution of a light distribution pattern.
Figure 14B:
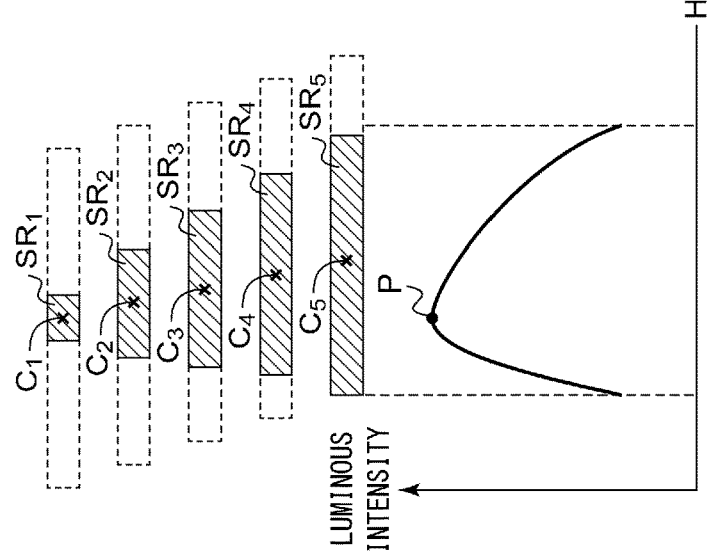
Figure 14C:
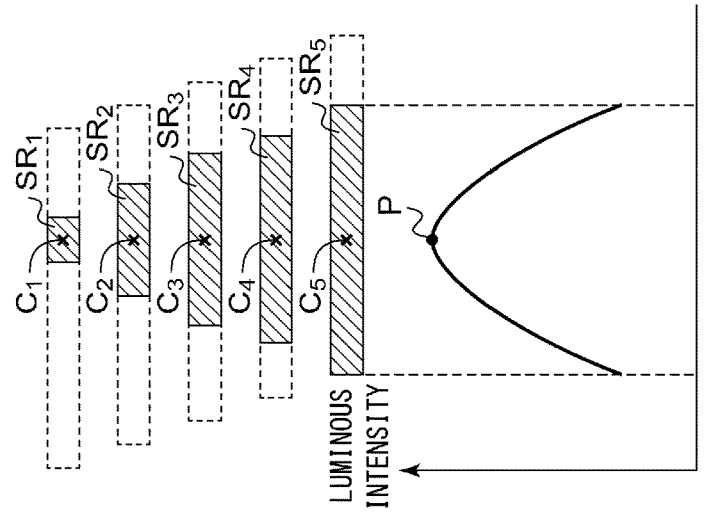

FIGS. 14 (*a*) to 14 (*c*) are illustrations for describing another example of a change in the luminous intensity distribution of a light distribution pattern. FIGS. 14 (*a*) to 14 (*c*) correspond to FIGS. 12(*a*) to 12 (*c*), respectively.

In this example, the lamp controlling unit 20 turns on each of the light emitting units 34_1 to 34_4 at an earlier timing in the scan illustrated in FIG. 14(*b*) than in the scan illustrated in FIG. 14 (*a*) and turns off each of the light emitting units 34_1 to 34_4 at an earlier timing in the scan illustrated in FIG. 14(*b*) than in the scan illustrated in FIG. 14(*a*). In addition, the lamp controlling unit 20 turns on each of the light emitting units 34_1 to 34_4 at an earlier timing in the scan illustrated in FIG. 14(*c*) than in the scan illustrated in FIG. 14 (*b*) and turns off each of the light emitting units 34_1 to 34_4 at an earlier timing in the scan illustrated in FIG. 14(*c*) than in the scan illustrated in FIG. 14(*b*). Moreover, the lamp controlling unit 20 turns off the light emitting unit 34_5 at an earlier timing in the scan illustrated in FIG. 14 (*b*) than in the scan illustrated in FIG. 14(*a*) and turns off the light emitting unit 34_5 at an earlier timing in the scan illustrated in FIG. 14(*c*) than in the scan illustrated in FIG. 14(*b*).

With this control, as illustrated in FIGS. 14(*a*) to 14(*c*), the center position $C_i$ of each scan region $SR_i$ in the horizontal direction is located further to the left in the scan illustrated in FIG. 14(*b*) than in the scan illustrated in FIG. 14 (*a*) and located further to the left in the scan illustrated in FIG. 14 (*c*) than in the scan illustrated in FIG. 14(*b*). Then, as illustrated in FIGS. 14(*a*) to 14(*c*), the luminous intensity distribution is so changed as to move the peak position P in the luminous intensity of the light distribution pattern to the left.

If the lamp controlling unit 20 controls each light emitting unit 34_*i* such that the center position $C_i$ of each scan region $SR_i$ in the horizontal direction moves to the right as the scans progress, the lamp controlling unit 20 can so change the luminous intensity distribution as to move the peak position P in the luminous intensity of the light distribution pattern to the right.

The lamp controlling unit 20 may change an on period of each light emitting unit 34 within one scan period to move the peak position P in the luminous intensity of the light distribution pattern in accordance with the shape of the road ahead of the vehicle. Specifically, the lamp controlling unit 20 may move the peak position P in the luminous intensity of the light distribution pattern to the direct front when the vehicle is traveling straight ahead, to the left when the vehicle is traveling along a left curve, or to the right when the vehicle is traveling along a right curve. In this case, the vehicle controlling unit 16 detects a curve based on information from the camera 10 and/or the steering angle sensor 13 and generates a light distribution command indicating the luminous intensity corresponding to the curve. The lamp controlling unit 20 controls each light emitting unit 34_*i* in accordance with the light distribution command.

Moving the peak position in the luminous intensity of the light distribution pattern in accordance with the shape of the road ahead of the vehicle makes it possible to illuminate the traveling direction brightly.

In the case described above, the peak position P in the luminous intensity is moved through a change in the on period of every lowermost light emitting unit within one scan period. This, however, is not a limiting example. Alternatively, the peak position P in the luminous intensity may be moved through a change in the on period of at least one light emitting unit within one scan period.

FIGS. 15 (*a*) to 15 (*c*) are illustrations for describing yet another example of a change in the luminous intensity distribution of a light distribution pattern. FIGS. 15(*a*) to 15(*c*) correspond to FIGS. 12(*a*) to 12(*c*), respectively.

In this example, the lamp controlling unit 20 turns on all the lowermost light emitting units 34 for at least a partial time segment within one scan period in the scan illustrated in FIG. 15 (*a*), keeps the light emitting units 34_2 and 34_4 turned off for one entire scan period in the scan illustrated in FIG. 15 (*b*), and keeps the light emitting units 34_1, 34_2 and 34_4 turned off for one entire scan period in the scan illustrated in FIG. 15 (*c*).

In this manner, at least one of the light emitting units 34 that are on for at least a partial time segment in one scan is kept turned off for the entire scan period in the next scan. Then, as illustrated in FIGS. 15 (*a*) to 15 (*c*), the luminous intensity distribution in which the peak in the luminous intensity is relatively high and the luminous intensity changes relatively sharply in the horizontal direction can be changed to the luminous intensity distribution in which the peak in the luminous intensity is relatively low and the luminous intensity changes relatively gently in the horizontal direction.

Conversely, the lamp controlling unit 20 may turn on at least one of the light emitting units 34 that are kept turned off for the entire scan period in one scan for at least a partial time segment in the next scan. Then, the lamp controlling unit 20 can change the luminous intensity distribution in which the peak in the luminous intensity is relatively low and the luminous intensity changes relatively gently in the horizontal direction to the luminous intensity distribution in which the peak in the luminous intensity is relatively high and the luminous intensity changes relatively sharply in the horizontal direction. For example, the luminous intensity distribution can be changed by turning on the light emitting units 34 in the order illustrated in FIG. 15(*c*), in FIG. 15 (*b*), and in FIG. 15(*a*).

In any case, the lamp controlling unit 20 can change the luminous intensity distribution by keeping at least one light emitting unit turned off for one entire scan period.

FIGS. 16(*a*) and 16(*b*) are illustrations for describing another example of a change in the luminous intensity distribution of a light distribution pattern. FIGS. 16(*a*) and 16(*b*) correspond to FIGS. 12(*a*) and 12 (*c*), respectively.

Figure 16A:
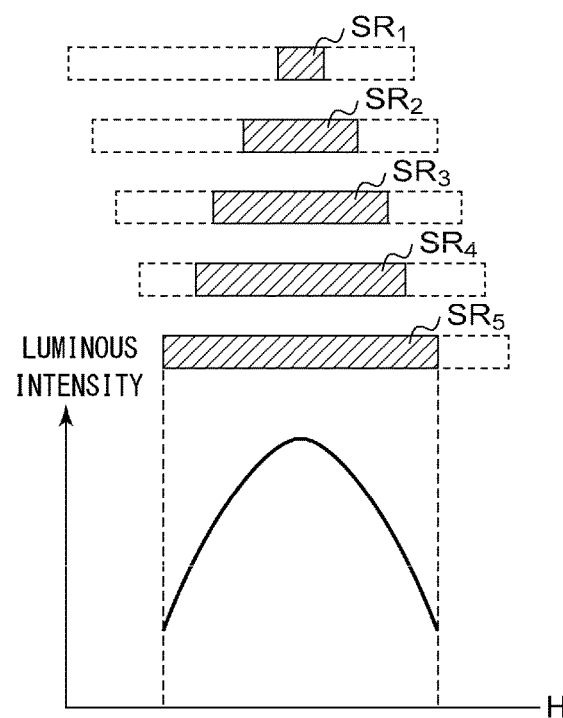
FIGS. 16A and 16B are illustrations for describing another example of a change in the luminous intensity distribution of a light distribution pattern.

In this example, the lamp controlling unit 20 turns on all the light emitting units for the time segment corresponding to the direct front of the vehicle in the scan illustrated in FIG. 16(a). Meanwhile, the lamp controlling unit 20 turns off the light emitting units 34_1 to 34_4 for the time segment corresponding to the direct front of the vehicle and turns them on for the time segment on each side of the time segment corresponding to the direct front of the vehicle in the scan illustrated in FIG. 16 (b).

As illustrated in FIGS. 16(a) and 16 (b), this control changes the luminous intensity distribution in which the peak is present in the direct front of the vehicle to the luminous intensity distribution in which the light in the direct front of the vehicle is reduced.

Figure 16B:
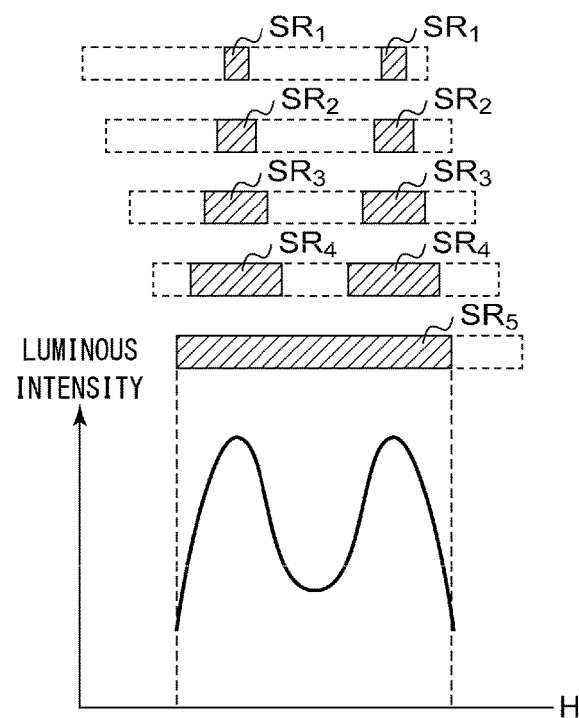

The lamp controlling unit 20 may adopt the luminous intensity distribution in which the light in the direct front of the vehicle is reduced as illustrated in FIG. 16(b) when the current weather in the surroundings of the vehicle is a bad weather. In a bad weather, illumination light is reflected diffusely by rain droplets or fog droplets, and some or a large portion of the reflected light is redirected toward the driver, which may cause poor visibility in the direct front of the vehicle. Reducing the light in the direct front of the vehicle can reduce such veiling glare and improve the visibility in the direct front of the vehicle. In this case, the vehicle controlling unit 16 detects the current weather in the surroundings of the vehicle based on information from the weather detecting unit 14 and generates a light distribution command indicating a luminous intensity distribution corresponding to the weather. For example, the vehicle controlling unit 16 generates a light distribution command indicating a luminous intensity distribution having a peak in the direct front of the vehicle if the current weather is a normal weather or generates a light distribution command indicating a luminous intensity distribution in which the light in the direct front of the vehicle is reduced if the current weather is a bad weather. The lamp controlling unit 20 controls each light emitting unit 34_i in accordance with the generated light distribution command.

With the vehicle lamp 18 according to the present embodiment described above, an on period of at least one light emitting unit within one scan period is changed. This makes it possible to change the luminous intensity distribution of a light distribution pattern with the brightness of each light emitting unit 34 in an on state unchanged, that is, with the amount of driving current supplied to each light emitting unit 34 in an on state unchanged. In other words, a vehicle lamp that can change the luminous intensity distribution of a light distribution pattern can be achieved without the use of a microcomputer or the like that supports DA conversion and at relatively low cost.

Thus far, one aspect of the present invention has been described based on the third embodiment. Now, some modification examples associated with the third embodiment will be described.

First Modification Example

The illumination position of the light emitting unit 34 of the first lamp unit 24, which is a lamp unit of a scan method, moves along with the periodic motion of the reflective body 38. Therefore, if the brightness of the light emitting unit 34 is controlled through PWM illumination adjustment in which the light emitting unit 34 is turned on and off repeatedly at high speed, a region that fails to be illuminated with light may arise. Accordingly, the brightness of the light emitting unit 34 is typically controlled through DC illumination adjustment in which the value of the current supplied to the light emitting unit 34 is varied. In the DC illumination adjustment, allowing the brightness of each light emitting unit 34 to be controlled requires that the value of the current supplied to the light emitting units 34 can be controlled for each light emitting unit 34. This requires separate converters for the respective light emitting units 34, which may lead to an increase in cost.

Accordingly, in the present modification example, the illumination of a given light emitting unit 34 is adjusted by keeping the light emitting unit 34 turned off for one entire scan period at a predetermined proportion of the repeated scans.

This will be described with the light emitting unit 34_1 serving as an example. FIGS. 17(a) and 17(b) are each a timing chart illustrating an example of an on/off state of the light emitting unit 34_1. In the example illustrated in FIG. 17 (a), the lamp controlling unit 20 keeps the light emitting unit 34_1 turned off for the entire scan period in one out of two scans, that is, at a proportion of 50% of the repeated scans. This can achieve the luminous intensity that is 50% of the luminous intensity obtained when the light emitting unit 34_1 is turned on in every scan with the same amount of driving current supplied to the light emitting unit 34_1.

In the example illustrated in FIG. 17 (b), the lamp controlling unit 20 keeps the light emitting unit 34_1 turned off for the entire scan period in one out of four scans, that is, at a proportion of 25% of the repeated scans. This can achieve the luminous intensity that is 75% of the luminous intensity obtained when the light emitting unit 34_1 is turned on in every scan with the current supplied to the light emitting unit 34_1 at the same value.

Adjusting the illumination of at least one or more of the light emitting units 34 in this manner renders it unnecessary to provide a converter for each light emitting unit 34, that is, can reduce the number of converters, which can help suppress an increase in cost.

Second Modification Example

Figure 18A:
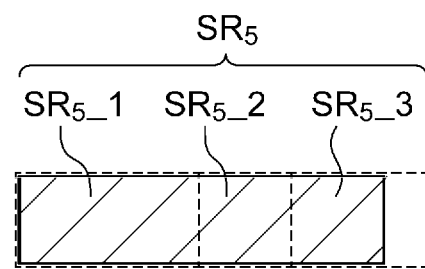
FIGS. 18A and 18B are illustrations for describing a case where the luminous intensity of a scan region formed by a light emitting unit is varied in the horizontal direction.
Figure 18B:
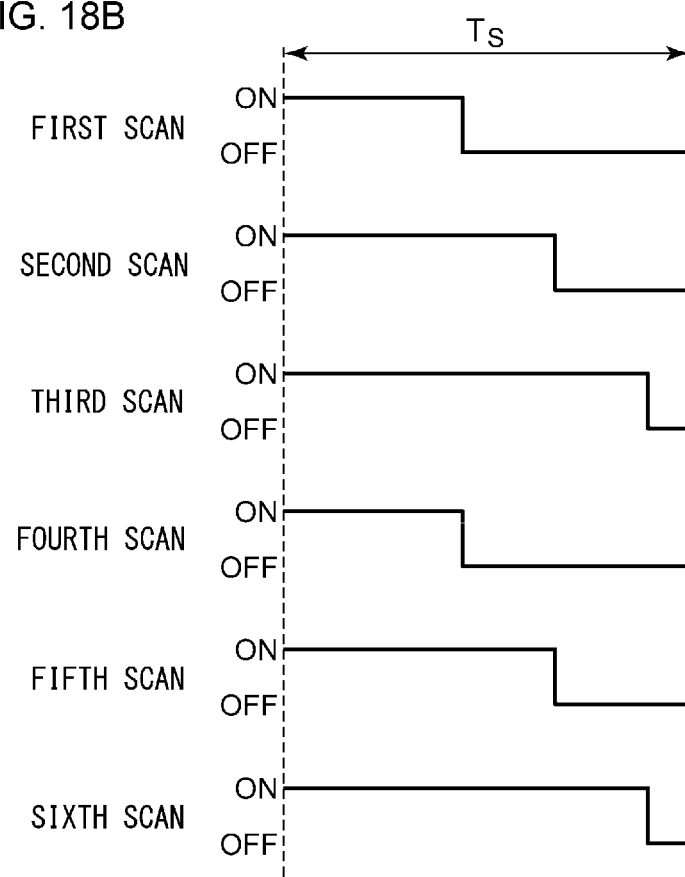

In the case described in the third embodiment, the luminous intensity in the scan region formed by the light emitting unit 34 is substantially uniform in the horizontal direction. This, however, is not a limiting example. FIGS. 18(a) and 18(b) are illustrations for describing a case where the luminous intensity of a scan region formed by a light emitting unit is varied in the horizontal direction. FIG. 18(a) illustrates a scan region $SR_5$ formed by the light emitting unit 34_5. FIG. 18 (b) is a timing chart illustrating an example of an on/off state of the light emitting unit 34_5.

In the present modification example, the lamp controlling unit 20 turns on the light emitting unit 34_5 in every scan for a time segment corresponding to a region $SR_5\_1$ of the scan region $SR_5$, turns on the light emitting unit 34_5 in two out of three scans, that is, at a proportion of approximately 67% of the repeated scans for a time segment corresponding to a region $SR_5\_2$, and turns on the light emitting unit 34_5 in one out of three scans, that is, at a proportion of approximately 33% of the repeated scans for a time segment corresponding to a region $SR_5\_3$. If the same amount of driving current is supplied in every time segment, the luminous intensity in the region $SR_5\_2$ is approximately 67% of the luminous intensity in the region $SR_5\_1$, and the luminous intensity in the region $SR_5\_3$ is approximately 33% of the luminous intensity in the region $SR_5\_1$. In other words, the luminous intensity in the scan region can be varied in the horizontal direction without a change in the amount of the driving current.

Third Modification Example

In the case described in the third embodiment, the first channel to the third channel illuminating the same height have an equal driving current, and the light emitting units 34 classified into these three channels have the same brightness. This, however, is not a limiting example. For example, the three channels may have different driving currents.

Fourth Modification Example

In the scan optical system 30 described in the third embodiment, the driving unit 36 is a motor, and the reflective body 38 is a reflector or is more specifically a rotary reflector. This, however, is not a limiting example. It suffices that the scan optical system 30 be configured such that the driving unit 36 drives the reflective body 38 and the reflective body 38 is driven by the driving unit 36 to repeat a periodic motion and thus scans an exit beam from a light source.

For example, in the scan optical system 30, the driving unit 36 may be a motor, and the reflective body 38 may be a mirror that can swing about an axis parallel to its reflective surface.

In addition, for example, the scan optical system 30 may be a MEMS (Micro Electro Mechanical System). Specifically, the driving unit 36 may be a resonator serving as an actuator, and the reflective body 38 may be a MEMS mirror. In this case, the rotation rate in the third embodiment may be read as a resonance frequency.

Fourth Embodiment

Figure 19:
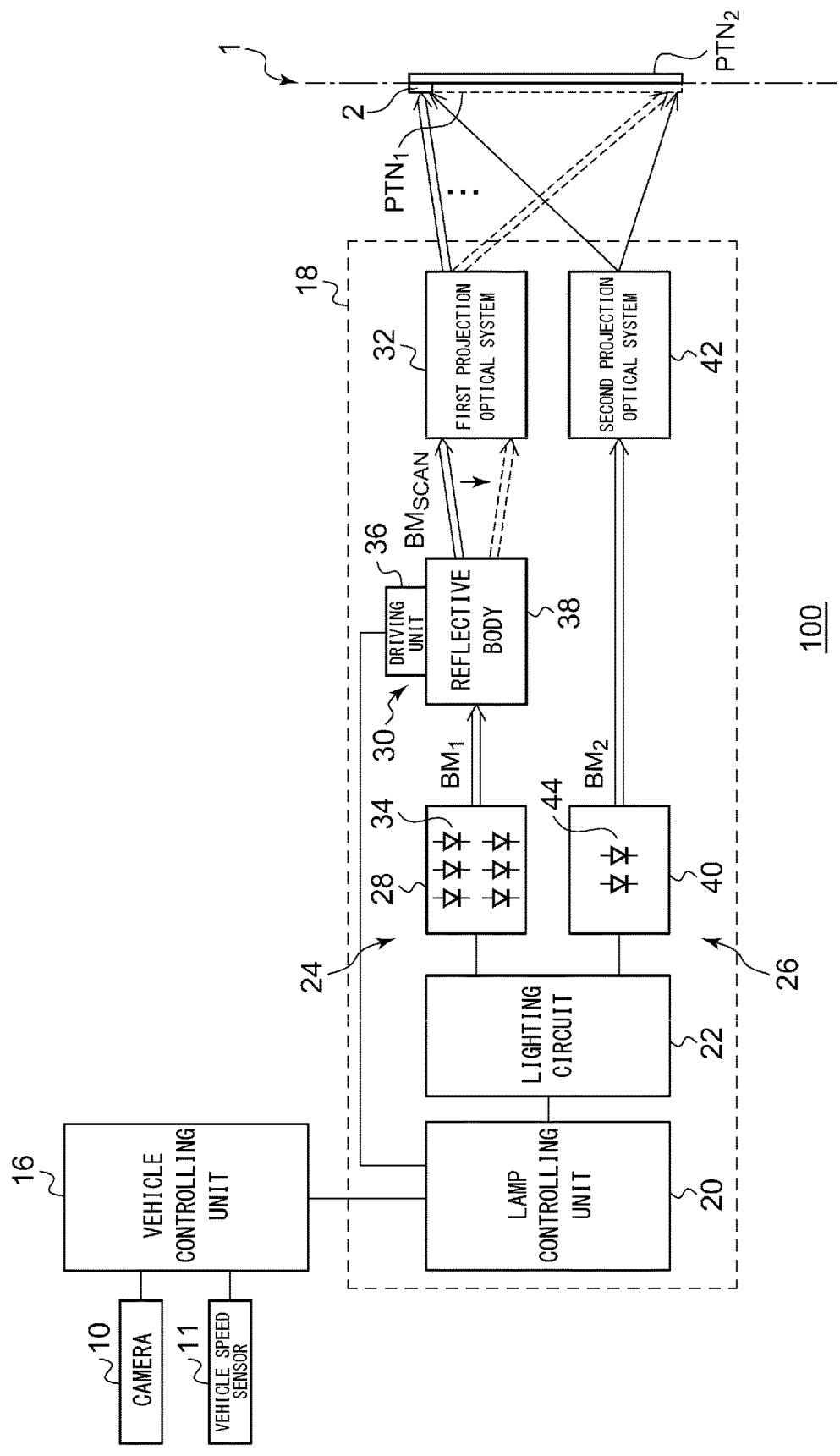
FIG. 19 is a schematic diagram illustrating a configuration of a vehicle lamp system that includes a vehicle lamp according to a fourth embodiment.

FIG. 19 is a schematic diagram illustrating a configuration of a vehicle lamp system 100 that includes a vehicle lamp 18 according to a fourth embodiment. The vehicle lamp system 100 includes a camera 10, a vehicle speed sensor 11, a vehicle controlling unit 16, and the vehicle lamp 18.

The camera 10 captures an image of a space in front of the vehicle. The vehicle speed sensor 11 detects the vehicle speed by detecting the rotation speed of wheels.

The vehicle controlling unit 16 integrally controls the vehicle. The vehicle controlling unit 16 according to the present embodiment is configured to be capable of executing ADB (Adaptive Driving Beam) control. The ADB control is executed in response to an execution instruction for the ADB control from a light switch (not illustrated), for example. The vehicle controlling unit 16 generates a light distribution command indicating a light distribution pattern to be formed in front of the vehicle based on information (traveling information) detected by the camera 10 and/or the vehicle speed sensor 11. For example, the vehicle controlling unit 16 detects any preceding vehicle, oncoming vehicle, pedestrian, or the like based on the traveling information and generates a light distribution command that sets a region where any preceding vehicle, oncoming vehicle, pedestrian, or the like has been detected as a non-illumination region. A non-illumination region refers to a region where the luminous intensity is no higher than the luminous intensity at which glare can be suppressed (referred to below as a "permitted limit luminous intensity").

The vehicle lamp 18 includes a lamp controlling unit 20, a lighting circuit 22, a first lamp unit 24 that illuminates a high beam region, and a second lamp unit 26 that illuminates a low beam region.

The first lamp unit 24 is a lamp unit of a scan method and includes a first light source 28, a scan optical system 30, and a first projection optical system 32. The first light source 28 includes at least one light emitting unit 34. It is assumed below that the first light source 28 includes a plurality of light emitting units 34. The light emitting unit 34 includes a semiconductor light source, such as an LED (light emitting diode) or an LD (laser diode).

The scan optical system 30 includes a driving unit 36 and a reflective body 38. The driving unit 36 is a motor in the present embodiment and is, for example, a brushless DC motor. The reflective body 38 is a reflector or is more specifically a rotary reflector in the present embodiment. The reflective body 38 is attached to a rotor of the driving unit 36 and makes a rotary motion. The reflective body 38 repeats the rotary motion and thus scans an exit beam $BM_1$ from the first light source 28 in the lateral direction. An exit beam from the scan optical system 30 will be referred to as a scan beam $BM_{SCAN}$. The scanning frequency of the scan optical system 30 is set to no lower than 60 Hz or set, for example, to around 200 Hz in order to prevent a flicker.

The first projection optical system 32 projects the scan beam $BM_{SCAN}$ scanned by the scan optical system 30 onto a virtual vertical screen 1 in front of the lamp and thus forms a first light distribution pattern $PTN_1$. A region illuminated by the scan beam $BM_{SCAN}$ at a given time will be referred to as an illumination region 2. The first light distribution pattern $PTN_1$ is formed as the illumination region 2 moves in the lateral direction over the virtual vertical screen 1.

The first projection optical system 32 can be constituted by a reflective optical system, a transmissive optical system, or a combination thereof. The first projection optical system 32 can be omitted if the divergence angle, the exit angle, and so on of the exit beam $BM_1$ from the first light source 28 are designed appropriately.

The second lamp unit 26 includes a second light source 40 and a second projection optical system 42. The second light source 40 includes at least one light emitting unit 44. The light emitting unit 44 includes a semiconductor light source, such as an LED (light emitting diode) or an LD (laser diode).

The second projection optical system 42 projects an exit beam $BM_2$ from the second light source 40 onto the virtual vertical screen 1 and thus forms a second light distribution pattern $PTN_2$ substantially vertically below the first light distribution pattern $PTN_1$. The second projection optical system 42 can be constituted by a reflective optical system, a transmissive optical system, or a combination thereof.

The lighting circuit 22 supplies a driving current to the first light source 28 and/or the second light source 40 in accordance with an instruction from the lamp controlling unit 20.

The lamp controlling unit 20 controls the lighting circuit 22 in accordance with a light distribution command from the vehicle controlling unit 16 and thus turns on or off the first light source 28 of the first lamp unit 24. For example, the lamp controlling unit 20 can vary the luminous intensity in the illumination region 2 over time in synchronization with the scanning motion of the scan optical system 30. For example, setting the brightness of the first light source 28 to no higher than the permitted limit luminous intensity (e.g., zero) in a certain time segment within one scan period can make the region corresponding to that time segment a non-illumination region (off region). Conversely, raising the brightness of the first light source 28 in a certain time segment within one scan period allows the region corresponding to that time segment to be illuminated with a spotlight.

The lamp controlling unit 20 also controls the rotation rate of the driving unit 36 and in turn the rotation rate of the reflective body 38. To keep the beam emitted from the first lamp unit 24 from flickering, the lamp controlling unit 20 turns on the first light source 28 while the rotation rate of the driving unit 36 is stable at a prescribed value. Specifically, the lamp controlling unit 20 turns on the first light source 28 immediately if the rotation rate of the driving unit 36 has stabilized at the prescribed value, that is, if the rotation rate has reached the prescribed value when the lamp controlling unit 20 has received an illumination instruction instructing the first lamp unit 24 to emit a beam. In contrast, if the rotation rate of the driving unit 36 has not stabilized at the prescribed value, that is, if the rotation rate has not reached the prescribed value (e.g., if the rotation rate is zero) when the lamp controlling unit 20 has received an illumination instruction, the lamp controlling unit 20 instructs that the driving unit 36 be driven to raise the rotation rate of the driving unit 36 and turns on the first light source 28 after the rotation rate of the driving unit 36 has stabilized at the prescribed value.

The lamp controlling unit 20 also controls the lighting circuit 22 in accordance with a light distribution command from the vehicle controlling unit 16 and thus supplies a constant driving current to the second light source 40 to keep the brightness of the second light source 40 constant, independent of the scanning motion of the scan optical system 30.

The description on the first lamp unit 24 according to the third embodiment given with reference to FIG. 6 applies to the first lamp unit 24.

The description on the light emitting unit 34 according to the third embodiment given with reference to FIGS. 7(a) to 7(c) applies to the light emitting unit 34.

Figure 20A:
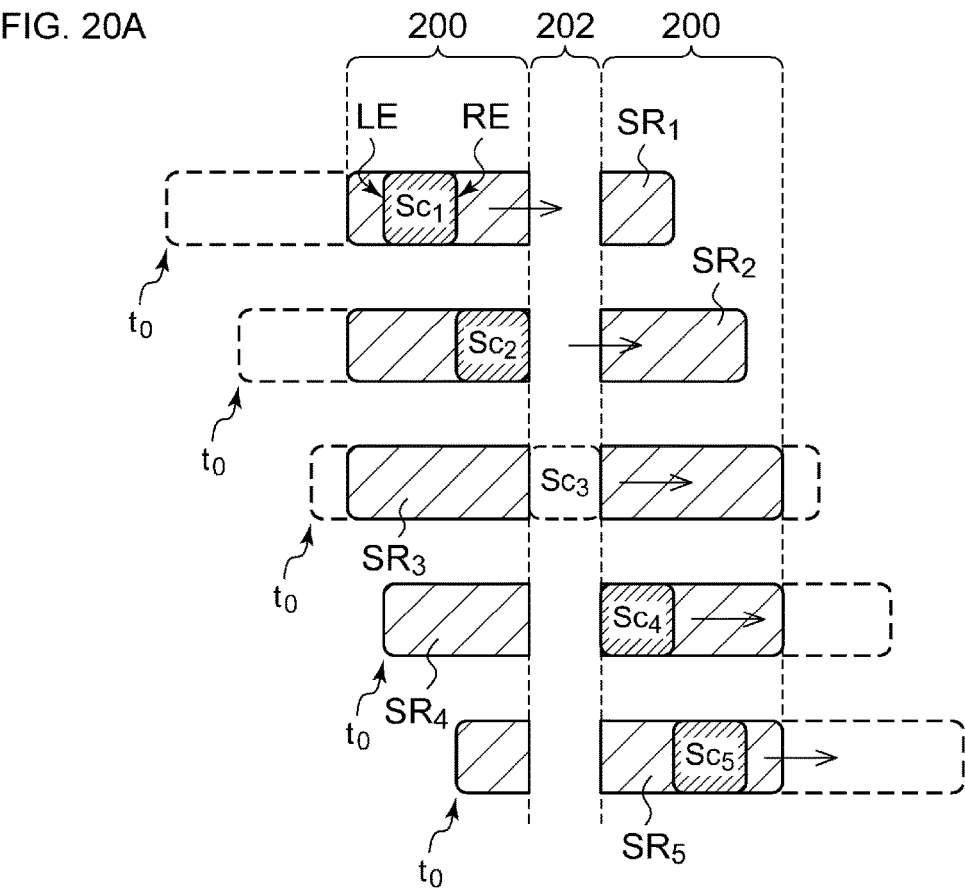
FIGS. 20A and 20B are illustrations for describing how a light distribution pattern is formed by a first lamp unit.
Figure 20B:
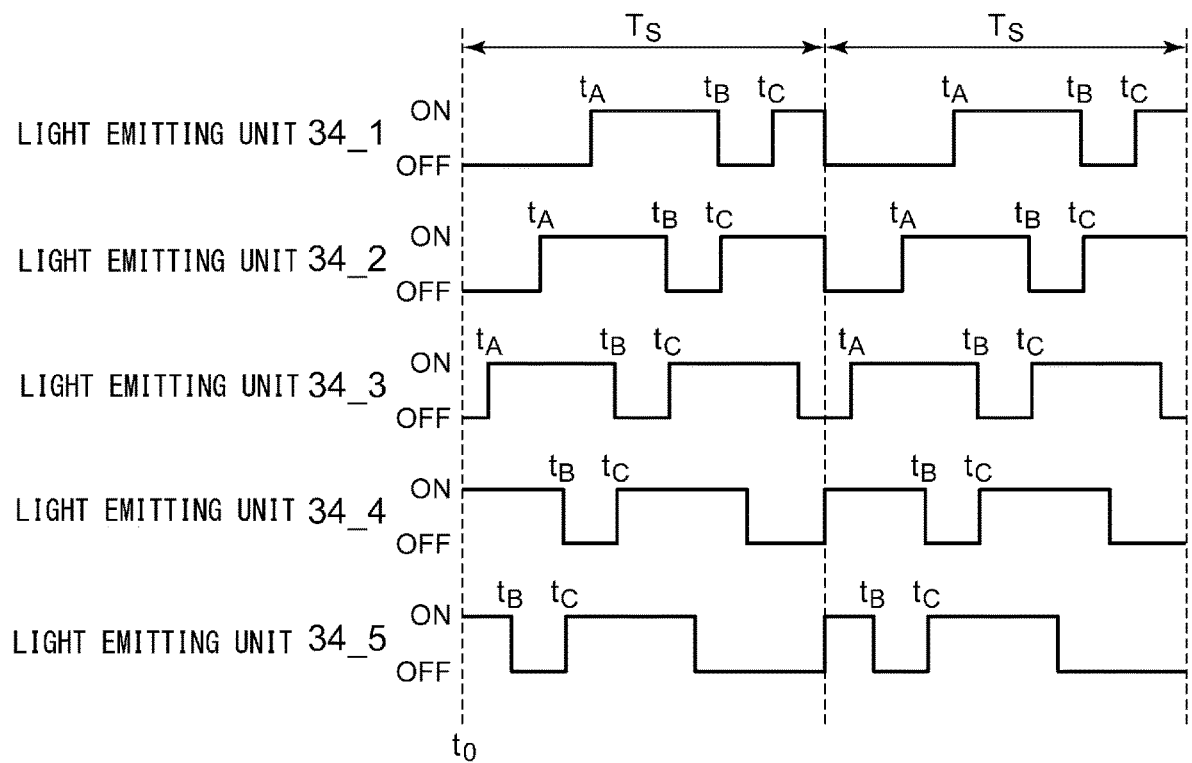

FIGS. 20(a) and 20(b) are illustrations for describing how a light distribution pattern is formed by the first lamp unit 24. In this example, how a non-illumination region (off region) in a light distribution pattern is formed in the vicinity of the H line by the lowermost light emitting units 34_1 to 34_5 will be described. FIG. 20(a) illustrates scan regions $SR_1$ to $SR_5$ formed by the respective light emitting units 34 offset from one another for better visualization. In each scan region SR, a region with hatching corresponds to an illumination region 200, and a region with no hatching corresponds to a non-illumination region 202. FIG. 20(b) is a timing chart illustrating an on/off state of each of the plurality of light emitting units 34. Ts represents a scanning period.

$Sc_1$ to $Sc_5$ indicate the positions of respective condensed spots at a given time. Each condensed spot Sc is scanned from left to right in FIG. 20(a).

For each of the light emitting unit 34_1 to the light emitting unit 34_5, the lamp controlling unit 20 turns on the light emitting unit 34_$i$ at timing $t_A$ at which the left end LE of the condensed spot $Sc_i$ reaches the left end of a region to serve as a scan region $SR_i$. Meanwhile, the lamp controlling unit 20 brings the brightness of the light emitting unit 34_$i$ to no higher than the permitted limit luminous intensity at timing $t_B$ at which the right end RE of the condensed spot $Sc_i$ reaches the non-illumination region 202 and brings the brightness of the light emitting unit 34_$i$ higher than the permitted limit luminous intensity at timing $t_c$ at which the left end LE of the condensed spot $Sc_i$ reaches the right end of the non-illumination region 202. This control makes it possible to form a light distribution pattern corresponding to the set of scan regions $SR_1$ to $SR_5$, that is, a light distribution pattern corresponding to a light distribution command.

Now, a luminous intensity distribution of a light distribution pattern having a non-illumination region 202 adapted for a vehicle in front of the host vehicle will be described.

Figure 21A:
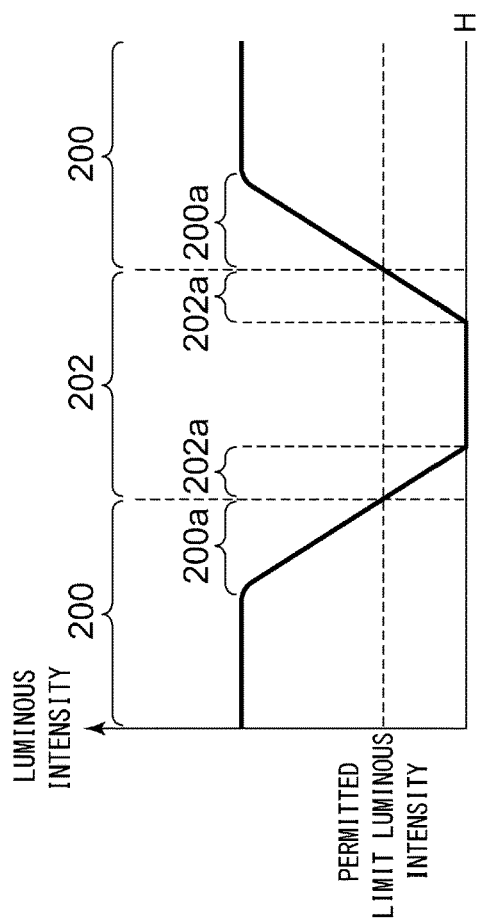
FIGS. 21A and 21B illustrate a luminous intensity distribution of a light distribution pattern having a non-illumination region adapted for a vehicle in front of a host vehicle.
Figure 21B:
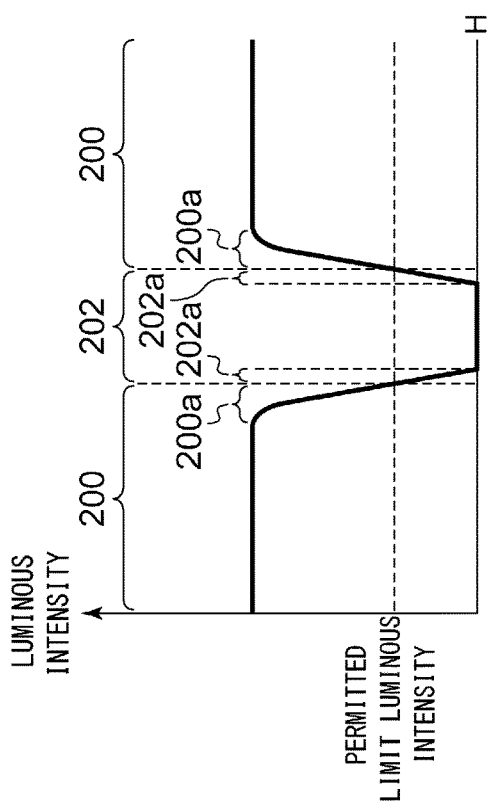

FIGS. 21(a) and 21(b) illustrate a luminous intensity distribution of a light distribution pattern having a non-illumination region 202 adapted for a vehicle in front of the host vehicle. In this example, the luminous intensity distribution of a light distribution pattern formed in the vicinity of the H line by the lowermost light emitting units 34_1 to 34_5 will be described. FIG. 21(a) illustrates a case where the distance between the host vehicle and the vehicle in front of the host vehicle is relatively large (i.e., the host vehicle is far from the vehicle in front of the host vehicle), and FIG. 21(b) illustrates a case where the distance between the host vehicle and the vehicle in front of the host vehicle is relatively small (i.e., the host vehicle is close to the vehicle in front of the host vehicle).

A sharp change in the luminous intensity at a boundary between an illumination region 200 and a non-illumination region 202 causes a sense of discomfort in the driver. To reduce this sense of discomfort, the lamp controlling unit 20 controls the first lamp unit 24 to allow the luminous intensity to change gradually in the vicinity of the boundary between the illumination region 200 and the non-illumination region 202. In the following, of the illumination region 200, a portion in the vicinity of the boundary with the non-illumination region 202 (i.e., an edge portion of the illumination region 200 where the illumination region 200 meets the non-illumination region 202) is referred to as an "illumination transition region 200a," where the luminous intensity is reduced gradually as the distance to the non-illumination region 202 decreases in order to reduce the sense of discomfort. In addition, of the non-illumination region, a portion in the vicinity of the boundary with the illumination region 200 (i.e., an edge portion of the non-illumination region where the non-illumination region meets the illumination region 200) is referred to as a "non-illumination transition region 202a," where the luminous intensity is reduced gradually as the distance from the illumination region 200 increases. The luminous intensity is at the permitted limit luminous intensity at an edge portion of the illumination transition region 200a where the illumination transition region 200a meets the non-illumination region 202 and at an edge portion of the non-illumination transition region 202a where the non-illumination transition region 202a meets the illumination region 200, that is, at the boundary between the illumination transition region 200a and the non-illumination transition region 202a. In the present embodiment, the luminous intensity is gradually reduced as the distance from the illumination region 200 increases so that the luminous intensity becomes zero at an edge portion of the non-illumination transition region 202a that is opposite to the illumination region 200.

When a vehicle in front of the host vehicle has moved to the right or the left relative to the host vehicle, the lamp controlling unit 20 controls the first lamp unit 24 to form a light distribution pattern in which the non-illumination region 202 is moved following the relative movement of the vehicle in front of the host vehicle based on a light distribution command from the vehicle controlling unit 16.

In this example, the amount of change in the angular position of the vehicle in front of the host vehicle per unit time, that is, the amount of change in the angular position where the vehicle in front of the host vehicle is located relative to the traveling direction of the host vehicle is larger as the distance between the host vehicle and the vehicle in front of the host vehicle is smaller even when the distance that the vehicle in front of the host vehicle has actually moved to the right or the left is constant. Therefore, the lamp controlling unit 20 sets the non-illumination region 202 with more margin in the angular range as the distance between the host vehicle and the vehicle in front of the host vehicle is smaller based on a light distribution command from the vehicle controlling unit 16. This makes it possible to suppress glare that could be experienced by the driver of the vehicle in front of the host vehicle when the vehicle in front of the host vehicle has moved to the right or the left relative to the host vehicle.

However, when the vehicle in front of the host vehicle has moved rapidly to the right or the left relative to the host vehicle, the non-illumination region 202 may not be able to follow the relative movement of the vehicle in front of the host vehicle because of the constraints on the detection performance of the camera 10 and/or the vehicle speed sensor 11, the computation performance of the vehicle controlling unit 16 and/or the lamp controlling unit 20, the communication performance between the devices, and so on, and the vehicle in front of the host vehicle may go off the non-illumination region 202 to enter the illumination region 200. As the distance between the host vehicle and the vehicle in front of the host vehicle is smaller, the vehicle in front of the host vehicle may go further off the non-illumination region 202. In this case, the driver of the vehicle in front of the host vehicle may experience glare.

Therefore, the lamp controlling unit 20 controls the first lamp unit 24 so that the luminous intensity changes more gently in the horizontal direction in each transition region as the distance between the host vehicle and the vehicle in front of the host vehicle is smaller, in other words, so that the angular range of each transition region becomes broader as the distance between the host vehicle and the vehicle in front of the host vehicle is smaller. Thus, even if the vehicle in front of the host vehicle goes relatively far off the non-illumination region 202 to enter the illumination region 200 when the distance between the host vehicle and the vehicle in front of the host vehicle is small, the driver of the vehicle in front of the host vehicle can be kept from experiencing glare. In addition, the angular range of the non-illumination transition region 202a in the non-illumination region 202 becomes relatively broad. As described above, a non-illumination region 202 with a margin in the angular range is set when the distance between the host vehicle and the vehicle in front of the host vehicle is small. Therefore, the vicinity of the vehicle in front of the host vehicle typically tends to be dark. In this respect, in the present embodiment, the vicinity of the vehicle in front of the host vehicle is illuminated with some light even though the brightness of the light is low enough not to cause glare. Therefore, the vicinity of the vehicle in front of the host vehicle can be kept from becoming too dark. Meanwhile, when the distance between the host vehicle and the vehicle in front of the host vehicle is large, the angular range of the illumination transition region 200a that is darker than the rest of the illumination region 200 becomes narrow. Therefore, the side of the illumination region 200 facing the non-illumination region 202 can be made relatively bright.

Now, a method of adjusting the change in the luminous intensity will be described.

Figure 22A:
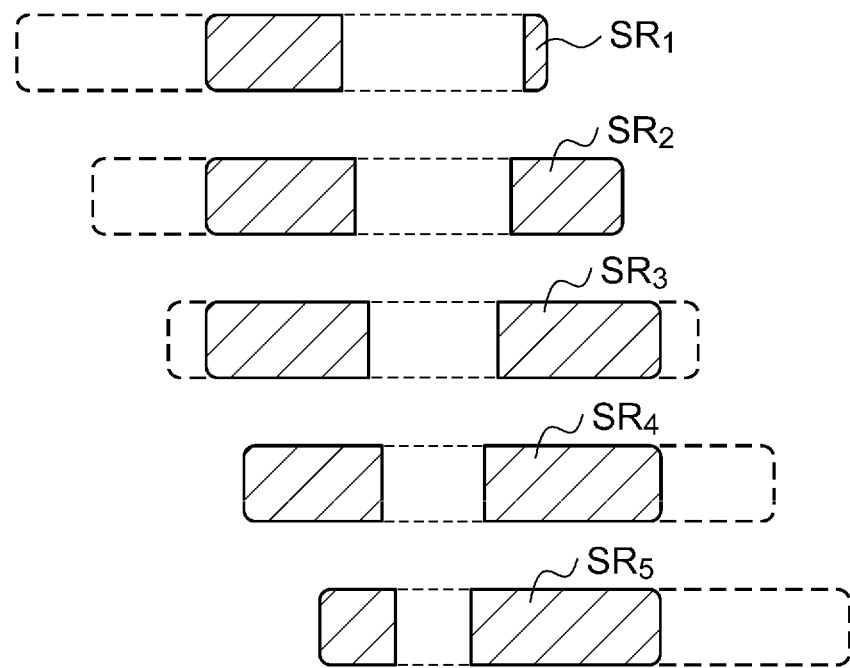
FIGS. 22A and 22B are illustrations for describing an example of a method of adjusting a change in the luminous intensity.
Figure 22B:
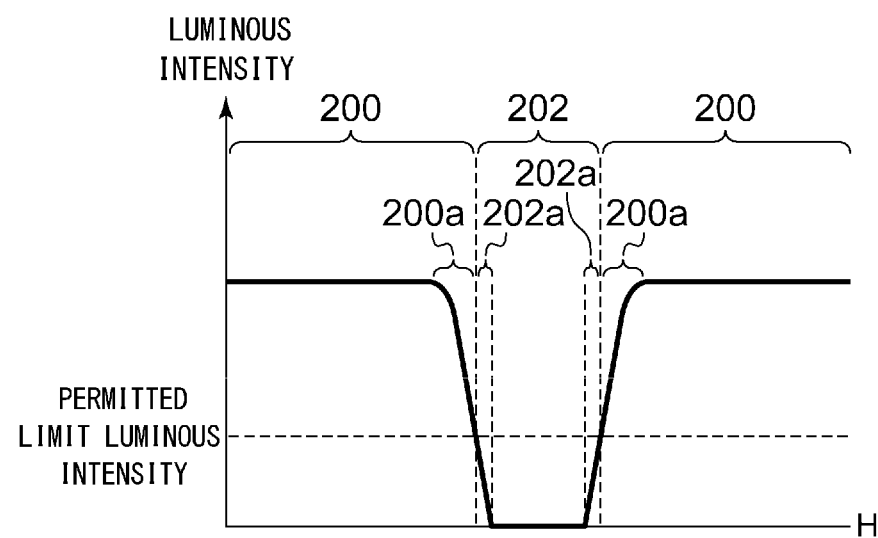

FIGS. 22(a) and 22(b) are illustrations for describing an example of a method of adjusting the change in the luminous intensity. FIG. 22(a) illustrates scan region SR1 to SR5 formed by the lowermost light emitting units 34_1 to 34_5 in a given scan. FIG. 22(b) illustrates the luminous intensity distribution, in the horizontal direction, of a light distribution pattern formed in the vicinity of the H line by the lowermost light emitting units 34_1 to 34_5 in the scan illustrated in FIG. 22(a).

In this example, the change in the luminous intensity in the horizontal direction is adjusted by changing the number of light emitting units 34 to be turned on. The luminous intensity changes more sharply if the number of light emitting units 34 to be turned on is changed in a shorter duration, and the luminous intensity changes more gently if the number of light emitting units 34 to be turned on is changed in a longer duration.

Figure 23A:
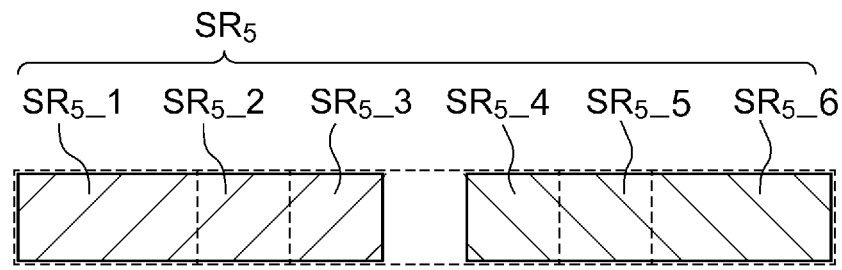
FIGS. 23A and 23B are illustrations for describing another example of a method of adjusting a change in the luminous intensity.
Figure 23B:
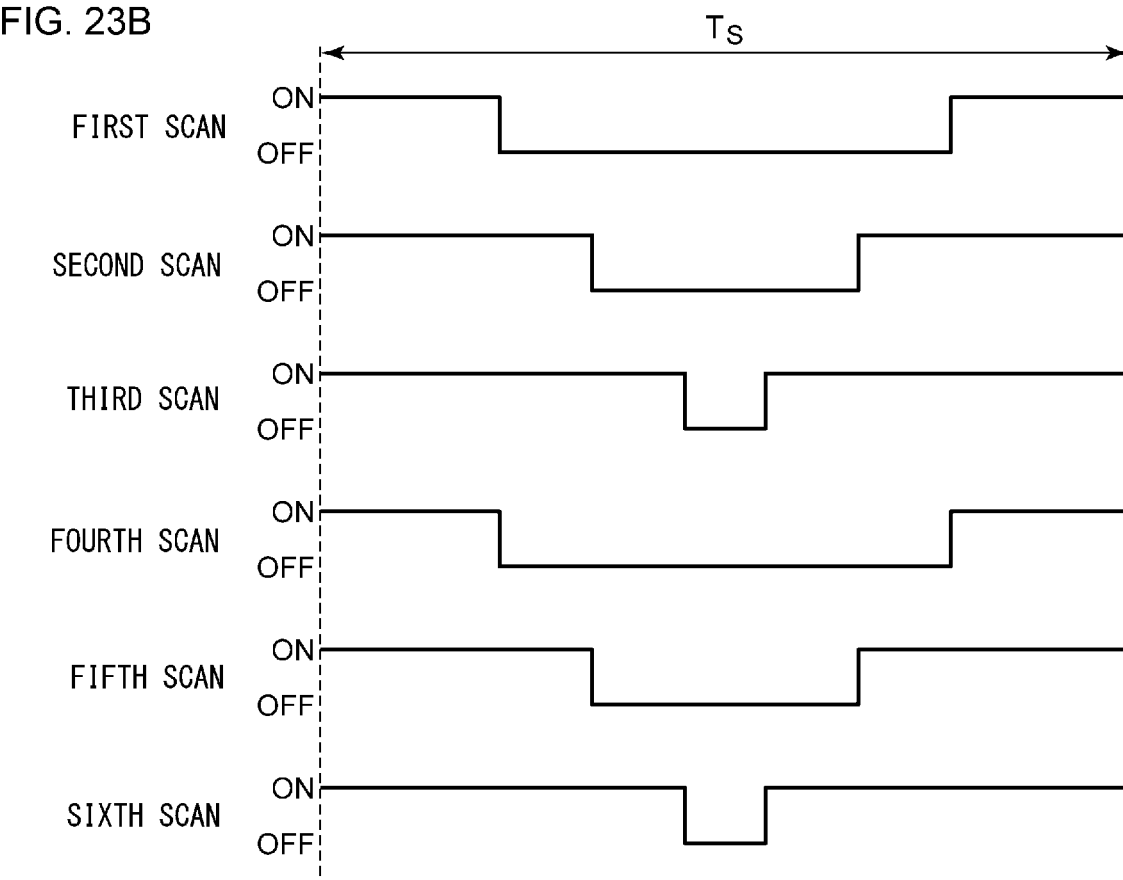

FIGS. 23(a) and 23(b) are illustrations for describing another example of a method of adjusting the change in the luminous intensity. This will be described with the light emitting unit 34_5 serving as an example. FIG. 23(a) illustrates a scan region SR5 formed by the light emitting unit 34_5. FIG. 23(b) is a timing chart illustrating an example of an on/off state of the light emitting unit 34_5.

The lamp controlling unit 20 turns on the light emitting unit 34_5 in every scan for a time segment corresponding to a region SR5_1 and a time segment corresponding to a region SR5_6 of the scan region SR5; turns on the light emitting unit 34_5 in two out of three scans, that is, at a proportion of approximately 67% of the repeated scans for a time segment corresponding to a region SR5_2 and a time segment corresponding to a region SR5_5; and turns on the light emitting unit 34_5 in one out of three scans, that is, at a proportion of approximately 33% of the repeated scans for a time segment corresponding to a region SR5_3 and a time segment corresponding to a region SR5_4. When the same amount of driving current is supplied in every time segment, the luminous intensity in the region SR5_2 and the region SR5_5 is approximately 67% of the luminous intensity in the region SR5_1, and the luminous intensity in the region SR5_3 and the region SR5_4 is approximately 33% of the luminous intensity in the region SR5_1. The luminous intensity in the region SR5_6 is the same as the luminous intensity in the region SR5_1. Controlling on/off of the light emitting unit 34_5 to make the angular range of the region SR5_2 and the region SR5_3 or of the region SR5_4 and the region SR5_5 narrower causes the luminous intensity in the horizontal direction to change more sharply, or controlling on/off of the light emitting unit 34_5 to make the stated angular range broader causes the luminous intensity in the horizontal direction to change more gently.

Adjusting the illumination of at least one light emitting unit 34 in this manner makes it possible to adjust the change in the luminous intensity in the horizontal direction.

In addition, for at least one light emitting unit 34, varying the value of the current supplied to that light emitting unit 34 within one scan period also makes it possible to adjust the change in the luminous intensity in the horizontal direction. In this case, the luminous intensity changes more sharply if the value of the current is varied in a shorter duration within one scan period, or the luminous intensity changes more gently if the value of the current is varied in a longer duration.

Thus far, one aspect of the present invention has been described based on the fourth embodiment. Now, some modification examples associated with the fourth embodiment will be described.

First Modification Example

Although not mentioned in particular in the fourth embodiment, the change in the luminous intensity in the horizontal direction may be adjusted in accordance with whether the vehicle in front of the host vehicle is a preceding vehicle or an oncoming vehicle or in accordance with whether the vehicle in front of the host vehicle is traveling straight ahead or traveling along a curve. This will be described in concrete terms below.

(Case where the Vehicle in Front of the Host Vehicle is an Oncoming Vehicle and is Traveling Straight Ahead)

In this case, in a traffic environment where vehicles travel on the left side of a road, an oncoming vehicle moves to the right relative to the host vehicle as the host vehicle and the oncoming vehicle approach each other. In other words, the oncoming vehicle may go off to the right of a non-illumination region 202. Therefore, the lamp controlling unit 20 controls the first lamp unit 24 so that, of illumination regions 200 on the right and left sides of the non-illumination region 202 corresponding to the oncoming vehicle, the luminous intensity in the illumination transition region 200a of the illumination region 200 on the right side changes even more gently than the luminous intensity in the illumination transition region 200a in the illumination region 200 on the left side. This makes it possible to keep the driver of the oncoming vehicle from experiencing glare even when the oncoming vehicle has moved rapidly to the right relative to the host vehicle and gone off the non-illumination region 202.

In a traffic environment where vehicles travel on the right side of a road, an oncoming vehicle moves to the left relative to the host vehicle as the host vehicle and the oncoming vehicle approach each other. In this case, the lamp controlling unit 20 controls the first lamp unit 24 so that, of illumination regions 200 on the right and left sides of the non-illumination region 202 corresponding to the oncoming vehicle, the luminous intensity in the illumination transition region 200a in the illumination region 200 on the left side changes even more gently than the luminous intensity in the illumination transition region 200a in the illumination region 200 on the right side. This makes it possible to keep the driver of the oncoming vehicle from experiencing glare even when the oncoming vehicle has moved rapidly to the left relative to the host vehicle and gone off the non-illumination region 202.

In other words, the lamp controlling unit 20 controls the first lamp unit 24 so that, of the two illumination regions 200 on the right and left sides of the non-illumination region 202 corresponding to the oncoming vehicle, the luminous intensity in the illumination transition region 200a in the illumination region 200 that is farther from the host vehicle's lane changes even more gently than the luminous intensity in the illumination transition region 200a in the illumination region 200 that is closer to the host vehicle's lane.

(Case where the Vehicle in Front of the Host Vehicle is a Preceding Vehicle and is Traveling Along a Curve)

In this case, the preceding vehicle moves to the left relative to the host vehicle while the preceding vehicle is traveling along a left curve, regardless of whether the vehicles are in a traffic environment where they travel on the left side of a road or in a traffic environment where they travel on the right side of a road. In other words, the preceding vehicle may go off to the left of the non-illumination region 202. Therefore, the lamp controlling unit 20 controls the first lamp unit 24 so that, of illumination regions 200 on the right and left sides of the non-illumination region 202 corresponding to the preceding vehicle, the luminous intensity in the illumination transition region 200a in the illumination region 200 on the left side changes even more gently than the luminous intensity in the illumination transition region 200a in the illumination region 200 on the right side. This makes it possible to keep the driver of the preceding vehicle from experiencing glare even when the preceding vehicle has gone off the non-illumination region 202 while traveling along a left curve.

The preceding vehicle moves to the right relative to the host vehicle while the preceding vehicle is traveling along a right curve, regardless of whether the vehicles are in a traffic environment where they travel on the left side of a road or in a traffic environment where they travel on the right side of a road. In other words, the preceding vehicle may go off to the right of the non-illumination region 202. In this case, the lamp controlling unit 20 controls the first lamp unit 24 so that, of illumination regions 200 on the right and left sides of the non-illumination region 202 corresponding to the preceding vehicle, the luminous intensity in the illumination transition region 200a in the illumination region 200 on the right side changes even more gently than the luminous intensity in the illumination transition region 200a in the illumination region 200 on the left side. This makes it possible to keep the driver of the preceding vehicle from experiencing glare even when the preceding vehicle has gone off the non-illumination region 202 while traveling along a right curve.

(Case where the Vehicle in Front of the Host Vehicle is an Oncoming Vehicle and Traveling Along a Curve).

In this case, the oncoming vehicle moves to the right relative to the host vehicle (to the right as viewed from the host vehicle) while the oncoming vehicle is traveling along a right curve as viewed from the oncoming vehicle (a left curve as viewed from the host vehicle), regardless of whether the vehicles are in a traffic environment where they travel on the left side of a road or in a traffic environment where they travel on the right side of a road. In other words, the oncoming vehicle may go off to the right of the non-illumination region 202. Therefore, the lamp controlling unit 20 controls the first lamp unit 24 so that, of illumination regions 200 on the right and left sides of the non-illumination region 202 corresponding to the oncoming vehicle, the luminous intensity in the illumination transition region 200a in the illumination region 200 on the right side changes even more gently than the luminous intensity in the illumination transition region 200a in the illumination region 200 on the left side. This makes it possible to keep the driver of the oncoming vehicle from experiencing glare even when the oncoming vehicle has gone off the non-illumination region 202 while the oncoming vehicle is traveling along a right curve as viewed from the oncoming vehicle.

The oncoming vehicle moves to the left relative to the host vehicle (to the left as viewed from the host vehicle) while the oncoming vehicle is traveling along a left curve as viewed from the oncoming vehicle (a right curve as viewed from the host vehicle), regardless of whether the vehicles are in a traffic environment where they travel on the left side of a road or in a traffic environment where they travel on the right side of a road. In other words, the vehicle in front the host vehicle may go off to the left of the non-illumination region 202. Therefore, the lamp controlling unit 20 controls the first lamp unit 24 so that, of illumination regions 200 on the right and left sides of the non-illumination region 202 corresponding to the oncoming vehicle, the luminous intensity in the illumination transition region 200a in the illumination region 200 on the left side changes even more gently than the luminous intensity in the illumination transition region 200a in the illumination region 200 on the right side. This makes it possible to keep the driver of the oncoming vehicle from experiencing glare even when the oncoming vehicle has gone off the non-illumination region 202 while the oncoming vehicle is traveling along a left curve as viewed from the oncoming vehicle.

The cases where the vehicle in front of the host vehicle is traveling along a curve are summarized. Regardless of whether the vehicle in front of the host vehicle is a preceding vehicle or an oncoming vehicle, and regardless of whether the vehicles are in a traffic environment where they travel on the left side of a road or in a traffic environment where they travel on the right side of a road, when the vehicle in front of the host vehicle is traveling along a left curve as viewed from the vehicle in front of the host vehicle, the lamp controlling unit 20 controls the first lamp unit 24 so that, of the illumination regions 200 on the right and left sides of the non-illumination region 202 corresponding to the vehicle in front of the host vehicle, the luminous intensity in the illumination transition region 200a in the illumination region 200 on the left side as viewed from the host vehicle changes even more gently than the luminous intensity in the illumination transition region 200a in the illumination region 200 on the right side as viewed from the host vehicle. Meanwhile, when the vehicle in front of the host vehicles is traveling along a right curve as viewed from the vehicle in front of the host vehicle, the lamp controlling unit 20 controls the first lamp unit 24 so that, of the illumination regions 200 on the right and left sides of the non-illumination region 202 corresponding to the vehicle in front of the host vehicle, the luminous intensity in the illumination transition region 200a in the illumination region 200 on the right side as viewed from the host vehicle changes even more gently than the luminous intensity in the illumination transition region 200a in the illumination region 200 on the left side as viewed from the host vehicle.

Second Modification Example

In the case described in the fourth embodiment, in each non-illumination transition region 202a of the non-illumination region 202 corresponding to a vehicle in front of the host vehicle, the luminous intensity is gradually reduced as the distance from the illumination region 200 increases so that the luminous intensity becomes zero at the edge portion opposite to the illumination region 200. This, however, is not a limiting example. It suffices that the luminous intensity in the non-illumination region 202 be no higher than the permitted limit luminous intensity. Therefore, for example, the luminous intensity in the non-illumination region 202 may be constant at the permitted limit luminous intensity. In other words, the non-illumination region 202 does not need to include the non-illumination transition regions 202a, and only the illumination region 200 may include a transition region. Then, the first lamp unit 24 may be controlled so that the luminous intensity in the illumination transition region 200a in the illumination region 200 changes more gently as the distance between the host vehicle and a vehicle in front of the host vehicle is smaller.

Third Modification Example

In the scan optical system 30 described in the fourth embodiment, the driving unit 36 is a motor, and the reflective body 38 is a reflector or is more specifically a rotary reflector. This, however, is not a limiting example. It suffices that the scan optical system 30 be configured such that the driving unit 36 drives the reflective body 38 and the reflective body 38 is driven by the driving unit 36 to repeat a periodic motion and thus scans an exit beam from a light source.

For example, in the scan optical system 30, the driving unit 36 may be a motor, and the reflective body 38 may be a mirror that can swing about an axis parallel to its reflective surface.

In addition, for example, the scan optical system 30 may be a MEMS (Micro Electro Mechanical System). Specifically, the driving unit 36 may be a resonator serving as an actuator, and the reflective body 38 may be a MEMS mirror. In this case, the rotation rate in the fourth embodiment may be read as a resonance frequency.

Thus, the configurations and the operations of the vehicle lamps according to the embodiments have been described. These embodiments, however, are merely illustrative, and it should be appreciated by a person skilled in the art that various modifications can be made to the combinations of the constituent elements of the embodiments and that such modifications also fall within the scope of the present invention.

The invention claimed is:

1. A vehicle lamp, comprising:
a first lamp unit capable of illuminating a first illumination region;
a second lamp unit capable of illuminating a second illumination region; and
a controlling unit that controls the first lamp unit and the second lamp unit, wherein
the first lamp unit includes a light source, a driving unit, and a reflective body that is driven by the driving unit to repeat a periodic motion and thus scans an exit beam from the light source, and
the controlling unit
instructs that the driving unit be driven until a first duration has passed even in a case where the controlling unit has received an illumination instruction instructing the first lamp unit to emit a beam and then received a stop instruction instructing the first lamp unit to stop emitting a beam, and
instructs that the driving unit be driven while the second lamp unit is emitting a beam, regardless of an instruction for the first lamp unit.

2. The vehicle lamp according to claim 1, wherein
the first illumination region includes at least a portion of a high beam light distribution region, and
the second illumination region is a low beam light distribution region.

3. The vehicle lamp according to claim 1, wherein
the driving unit is a motor, and
the controlling unit causes the motor to rotate at a predetermined rotation rate lower than a rotation rate held when the light source is on or reduces the rotation rate of the motor gradually in a case where the controlling unit has received a stop instruction instructing the first lamp unit to stop emitting a beam.

4. A vehicle lamp, comprising:
a first lamp unit capable of illuminating a first illumination region;
a second lamp unit capable of illuminating a second illumination region; and
a controlling unit that controls the first lamp unit and the second lamp unit, wherein
the first lamp unit includes a light source, a driving unit, and a reflective body that is driven by the driving unit to repeat a periodic motion and thus scans an exit beam from the light source, and
the controlling unit instructs that the driving unit be driven until a first duration has passed even in a case where the controlling unit has received an illumination instruction instructing the first lamp unit and the second lamp unit to emit a beam and then received a stop instruction instructing the first lamp unit and the second lamp unit to stop emitting a beam.

5. The vehicle lamp according to claim 4, wherein
the controlling unit instructs that the driving unit be driven until a second duration longer than the first duration has passed in a case where the controlling unit has received an illumination instruction instructing the first lamp unit and the second lamp unit to emit a beam and then received a stop instruction instructing the first lamp unit to stop emitting a beam.

6. A vehicle lamp, comprising:
a light source;
an optical system that repeats a periodic motion and thus scans an exit beam from the light source; and
a controlling unit that controls on/off of the light source to form a predetermined light distribution pattern, wherein
the controlling unit
sets a brightness of the light source to no higher than a predetermined value in a partial time segment within one scan period and thus forms a non-illumination region in a region corresponding to the partial time segment, and
when the non-illumination region is to be changed over to an illumination region, starts changing the non-illumination region over to the illumination region from one end and changes gradually toward another end of the non-illumination region in a widthwise direction of the vehicle to reduce a size of the non-illumination region, wherein
the controlling unit, when the non-illumination region is to be changed over to the illumination region, starts changing the non-illumination region over to the illumination region from, of two ends of the non-illumination region in the vehicle-width direction, only one end that is closer to a center portion of the light distribution pattern and changes gradually toward another end that is farther from the center portion.

7. The vehicle lamp according to claim 6, wherein
the controlling unit changes the entire non-illumination region over to the illumination region in a constant time regardless of a size of the non-illumination region.

8. The vehicle lamp according to claim 7, wherein
the constant time is 100-1000 msec.

9. The vehicle lamp according to claim 6, wherein
in a case where the non-illumination region includes a center portion of the light distribution pattern,
the controlling unit changes the non-illumination region over to the illumination region at one rate up to the center portion and at a different rate past the center portion.

10. The vehicle lamp according to claim 9, wherein
a first rate that is the rate at which the non-illumination region is changed over to the illumination region up to the center portion is higher than a second rate that is the rate at which the non-illumination region is changed over to the illumination region past the center portion.

11. The vehicle lamp according to claim 6, wherein
the periodic motion of the optical system has a period in a range of 2-10 msec, and
the controlling unit reduces the non-illumination region in each cycle of the periodic motion of the optical system.

12. A vehicle lamp, comprising:
a lamp unit that includes a first light emitting unit, a second light emitting unit, and an optical system that repeats a periodic motion and thus scans an exit beam from the first light emitting unit and an exit beam from the second light emitting unit; and
a controlling unit that sets an on period separately for each of the first light emitting unit and the second light emitting unit within one scan period in synchronization with the periodic motion and thus forms a light distribution pattern in which respective scan beams associated with the first light emitting unit and the second light emitting unit are combined, wherein
the controlling unit varies the on period, from one scan period to a subsequent scan period, of at least one of the first light emitting unit and the second light emitting unit and thus changes a luminous intensity distribution of the light distribution pattern, wherein
the controlling unit keeps at least one of the first light emitting unit and the second light emitting unit turned off for an entire scan period at a predetermined proportion of repeated scans and thus adjusts a luminous intensity of a combined light distribution pattern.

13. The vehicle lamp according to claim 12, wherein
the controlling unit turns off one of the first light emitting unit and the second light emitting unit and thus adjusts a luminous intensity of a combined light distribution pattern.

14. The vehicle lamp according to claim 12, wherein
the lamp unit illuminates a high beam region.

15. The vehicle lamp according to claim 12, wherein
the vehicle lamp is used as a headlamp, and
the controlling unit varies the on period, within one scan period, of at least one of the first light emitting unit and the second light emitting unit to move a peak position of the luminous intensity of the light distribution pattern in accordance with a shape of a road ahead of a vehicle.

16. A vehicle lamp, comprising:
a lamp unit that forms a light distribution pattern in front of a vehicle; and
a controlling unit that controls the lamp unit to allow the light distribution pattern to have a non-illumination region that is adapted for a vehicle in front of the vehicle and that has a luminous intensity no higher than a predetermined value, wherein
the controlling unit controls the lamp unit to cause a horizontal illumination region of the light distribution pattern to have a transition region, located in the vicinity of a boundary with the non-illumination region, that has a luminous intensity decreasing toward the non-illumination region and reaching a predetermined value at an end portion in the non-illumination region and to cause a level of change of the luminous intensity in the transition region to vary as a distance between a host vehicle and the vehicle in front of the host vehicle is smaller, wherein
in a case where the illumination region is to be formed on each of right and left sides of the non-illumination region corresponding to the vehicle in front of the host vehicle, (i) when the vehicle in front of the host vehicle is traveling along a left curve as viewed from the vehicle in front of the host vehicle, the controlling unit controls the lamp unit to cause the luminous intensity in the transition region of the illumination region that is, of the two illumination regions, on the left as viewed from the host vehicle to have a smaller change than a change in luminous intensity in the transition region of the illumination region that is on the right side as viewed from the host vehicle, or (ii) when the vehicle in front of the host vehicle is traveling along a right curve as viewed from the vehicle in front of the host vehicle, the controlling unit controls the lamp unit to cause the luminous intensity in the transition region of the illumination region that is, of the two illumination regions, on the right side as viewed from the host vehicle to have a smaller change than a change in luminous intensity in the transition region of the illumination region that is on the left side as viewed from the host vehicle.

17. The vehicle lamp according to claim 16, wherein in a case where the vehicle in front of the host vehicle is an oncoming vehicle and the illumination region is to be formed at each of right and left sides of the non-illumination region corresponding to the oncoming vehicle, the controlling unit controls the lamp unit to cause the luminous intensity in a transition region of the illumination region that is, of the two illumination regions, farther from a host vehicle's lane to have a smaller change than a change in luminous intensity in a transition region of the illumination region that is closer to the host vehicle's lane.

18. The vehicle lamp according to claim 16, wherein the lamp unit illuminates a high beam region.

19. A vehicle lamp, comprising:
a lamp unit that forms a light distribution pattern in front of a vehicle; and
a controlling unit that controls the lamp unit to allow the light distribution pattern to have a non-illumination region that is adapted for a vehicle in front of the vehicle and that has a luminous intensity no higher than a predetermined value, wherein
the controlling unit controls the lamp unit to cause a horizontal illumination region of the light distribution pattern to have a transition region, located in the vicinity of a boundary with the non-illumination region, that has a luminous intensity decreasing toward the non-illumination region and reaching a predetermined value at an end portion in the non-illumination region and to cause a level of change of the luminous intensity in the transition region to vary as a distance between a host vehicle and the vehicle in front of the host vehicle is smaller, wherein
the lamp unit includes a light source and a reflective body that repeats a periodic motion and thus scans an exit beam from the light source, and
the controlling unit sets a brightness of the light source to no higher than a predetermined value in a partial time segment within one scan period and thus forms a non-illumination region in a region corresponding to the partial time segment.

20. The vehicle lamp according to claim 19, wherein the light source includes one or more light emitting units, and
the controlling unit periodically changes an on period, within one scan period, of at least one of the one or more light emitting units and thus adjusts a change in the luminous intensity between the non-illumination region and an illumination region.

21. The vehicle lamp according to claim 19, wherein the light source includes a plurality of light emitting units, and
the controlling unit changes the number of the light emitting units to be turned on and thus adjusts a change in the luminous intensity between the non-illumination region and an illumination region.

22. The vehicle lamp according to claim 19, wherein the lamp unit illuminates a high beam region.

* * * * *